US012406281B2

United States Patent
Kudlacz et al.

(10) Patent No.: US 12,406,281 B2
(45) Date of Patent: *Sep. 2, 2025

(54) METHODS AND SYSTEMS FOR SERVING ADVERTISEMENTS

(71) Applicant: Shopify Inc., Ottawa (CA)

(72) Inventors: Marek Kudlacz, Ajax (CA); Peter James McCracken, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,594

(22) Filed: May 9, 2023

(65) Prior Publication Data
US 2023/0281660 A1 Sep. 7, 2023

Related U.S. Application Data

(63) Continuation of application No. 17/112,813, filed on Dec. 4, 2020, now Pat. No. 11,682,038.

(51) Int. Cl.
*G06Q 30/02* (2023.01)
*G06F 16/903* (2019.01)
*G06Q 30/0251* (2023.01)
*G06Q 30/0241* (2023.01)

(52) U.S. Cl.
CPC ... *G06Q 30/0251* (2013.01); *G06F 16/90335* (2019.01); *G06Q 30/0248* (2013.01)

(58) Field of Classification Search
CPC .................................................. G06F 16/90335
See application file for complete search history.

(56) References Cited

U.S. PATENT DOCUMENTS

| | | | |
|---|---|---|---|
| 2009/0125719 A1 | 5/2009 | Cochran | |
| 2012/0296715 A1 | 11/2012 | Barbeau | |
| 2013/0346202 A1* | 12/2013 | Kouladjie | G06Q 30/06 705/14.55 |
| 2014/0100960 A1* | 4/2014 | Ning | G06Q 30/0261 705/14.58 |
| 2014/0172552 A1* | 6/2014 | Raab | G06Q 30/0248 705/14.47 |
| 2015/0281263 A1 | 10/2015 | McLaughlin | |
| 2016/0301735 A1 | 10/2016 | Lind | |
| 2016/0321689 A1 | 11/2016 | Turgeman | |
| 2017/0032412 A1* | 2/2017 | Scharber | G06F 16/24573 |
| 2017/0091809 A1 | 3/2017 | Liu et al. | |

FOREIGN PATENT DOCUMENTS

JP 6568538 B2 8/2019

* cited by examiner

*Primary Examiner* — Vincent M Cao
(74) *Attorney, Agent, or Firm* — Smart & Biggar LP

(57) ABSTRACT

Methods and systems for serving advertisement objects on an advertising platform are disclosed. The advertising platform detects invalid activity related to advertisement objects served in response to a request, and identifies a source associated with the invalid activity. In response to detection of the invalid activity, at least one decoy advertisement object is served in response to further requests originating from the identified source. The decoy advertisement object is an advertisement object that is processed by the advertising platform differently from regular advertisement objects that are served by the advertising platform in response to requests from other sources.

20 Claims, 10 Drawing Sheets

METHODS AND SYSTEMS FOR SERVING ADVERTISEMENTS

CROSS-REFERENCE TO RELATED APPLICATIONS

The present application is a continuation of U.S. patent application Ser. No. 17/112,813, filed Dec. 4, 2020, entitled "METHODS AND SYSTEMS FOR SERVING ADVERTISEMENTS", the contents of which are incorporated herein by reference in their entireties.

FIELD

The present disclosure is related to serving advertisements on an advertising platform. In particular, the present disclosure relates to methods and systems for responding to detected invalid activity related to advertisements on the advertising platform.

BACKGROUND

Advertisers often pay an advertising platform to display advertising for their products or services. An example of such an advertising platform may be a platform that displays advertisements relating to software applications on a digital distribution platform (commonly referred to as an app store). These advertisements are often purchased on a pay-per-click basis (in which the advertiser pays each time a user clicks on a displayed advertisement) or a pay-per-view/impression basis (in which the advertiser pays each time the advertisement is displayed to a user).

Advertisements served on the advertising platform can be the target of invalid activity. In general, any interaction with an advertisement that is not an action by a real user having interest in the advertisement may be considered invalid activity. In particular, some invalid activity may be an intentional attack or fraud on the advertising platform, which may be platform-wide (i.e., indiscriminate to any specific advertisement) or may be targeted towards certain advertisement(s). Such invalid activity, if sustained, can create significant financial and trust issues for the platform.

On the financial side, invalid activity that is detected typically results in the platform issuing credits to affected advertiser(s) for the advertisements served during the attack. If the invalid activity is not detected, the result is that the affected advertiser(s) are charged by the platform for interactions that are not from real customers. Invalid activity also damages advertisers' trust in the advertising platform. Extended periods of invalid activity can leave advertisers with poor return on investment (ROI) on purchased advertisements, in spite of reporting metrics that indicate high interaction with the advertisements. In such a scenario, advertisers are no longer able to trust the reported performance for their advertisements on the platform, and advertisers are no longer motivated to continue purchasing advertisements on the platform.

SUMMARY

Existing solutions may detect such invalid activity, but may take no action against the invalid activity. In some cases, advertisers may be compensated (e.g., by refunding payments for the invalid activity); however, even so, such an approach does not remedy the problem of financial loss to the platform (and possibly also for an advertising network and advertisers providing advertisements via the platform), and does not remedy the lost opportunity to display the advertisement to a real user. Other existing solutions may block a bad actor, once detected (e.g., by blocking an IP address that is the source of invalid activity). However, once bad actors are aware that their invalid activity has been detected, they will often modify their behavior (e.g., initiate another attack from a different IP address), making them difficult to detect again. Further, there is typically an inherent delay in detecting invalid activity (e.g., due to the time lag between start of the invalid activity and the time when the invalid activity reaches a detectable level) and each time a bad actor initiates a new attack (e.g., using a different IP address) after being detected, the bad actor can cause financial damage during the time delay until the new attack is detected and blocked. Accordingly, it would be preferable to keep a bad actor occupied and unaware that they have been detected, to avoid the bad actor modifying their behavior to launch a new attack. It should be noted that the speed of such attacks and their modification may be very fast (e.g., a bad actor can automate using random IP addresses for attacks), for example on the order of seconds or even milliseconds. Because a bad actor can use sophisticated technology to automate attacks on the advertising platform, any successful solution to mitigate such attacks should also be highly responsive and automated. A solution that relies solely or mainly on human intervention may be insufficiently fast to be a successful defense against sophisticated attacks.

In various examples, the present disclosure describes methods and systems that enable an advertising platform to continue serving advertisement objects to an identified source of detected invalid activity. For example, the advertising platform may continue to serve advertisement objects that are decoys to the identified source, after the invalid activity has been detected. Interactions with decoy advertisement objects are tracked and processed by the advertising platform differently from interactions with advertisement objects that are real advertisements.

In addition to serving decoy advertisement objects after invalid activity has been detected, decoy advertisement objects may also be served as a way to detect invalid activity.

Accordingly, examples described herein may enable a more intelligent way to respond to detected invalid activity. In particular, by continuing to serve advertisement objects that are decoys to an identified source of invalid activity rather than blocking the identified source, the identified source is kept unaware it has been detected while the invalid activity is mitigated by the advertising platform.

In some examples, the present disclosure describes a method for serving advertisement objects on an advertising platform. The method includes: detecting invalid activity related to one or more advertisement objects served in response to a request, a source being identified and associated with the invalid activity; in response to detection of the invalid activity, serving at least one decoy advertisement object in response to further requests originating from the identified source, the at least one decoy advertisement object being an advertisement object that is processed by the advertising platform differently from regular advertisement objects that are served by the advertising platform in response to requests from other sources.

In any of the above examples, the one or more advertisement objects may be served in response to a request that is one of: a search query; a view event; a navigation event; or a home page event.

In any of the above examples, the decoy advertisement object may be one of: an advertisement object that is configured to be unrenderable by a browser; an advertisement object that is configured to be unviewable when rendered by the browser; an advertisement object that is not associated with a user account on the advertising platform; or an advertisement object that is generated randomly by the advertising platform.

In any of the above examples, detecting the invalid activity may include: configuring at least one of the one or more advertisement objects to be unrenderable or unviewable when rendered; and detecting activity related to the at least one unrenderable or unviewable advertisement object as the invalid activity, and identifying the source of the detected activity.

In any of the above examples, detecting the invalid activity may include: detecting activity related to the one or more advertisement objects; comparing the detected activity with a defined threshold; and in response to the comparing, identifying the detected activity as the invalid activity.

In any of the above examples, the method may also include: in response to detection of the invalid activity, identifying historical activity from the identified source as invalid activity.

In any of the above examples, activity related to the at least one decoy advertisement object may be tracked by the advertising platform as further invalid activity.

In some example aspects, the present disclosure describes a system for implementing an advertising platform. The system includes a processor in communication with storage, the processor configured to execute instructions from the storage to cause the advertising platform to: detect invalid activity related to one or more advertisement objects served in response to a request, a source being identified and associated with the invalid activity; in response to detection of the invalid activity, serve at least one decoy advertisement object in response to further requests originating from the identified source, the at least one decoy advertisement object being an advertisement object that is processed by the advertising platform differently from regular advertisement objects that are served by the advertising platform in response to requests from other sources.

In some examples, the processor may be configured to execute instructions to cause the advertising platform to perform any of the methods described herein.

In some example aspects, the present disclosure describes a computer-readable medium storing instructions that, when executed by a processor of a system implementing an advertising platform, cause the advertising platform to: detect invalid activity related to one or more advertisement objects served in response to a request, a source being identified and associated with the invalid activity; in response to detection of the invalid activity, serve at least one decoy advertisement object in response to further requests originating from the identified source, the at least one decoy advertisement object being an advertisement object that is processed by the advertising platform differently from regular advertisement objects that are served by the advertising platform in response to requests from other sources.

In some examples, the computer-readable medium, when executed by the processor, may cause the advertising platform to perform any of the methods described herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
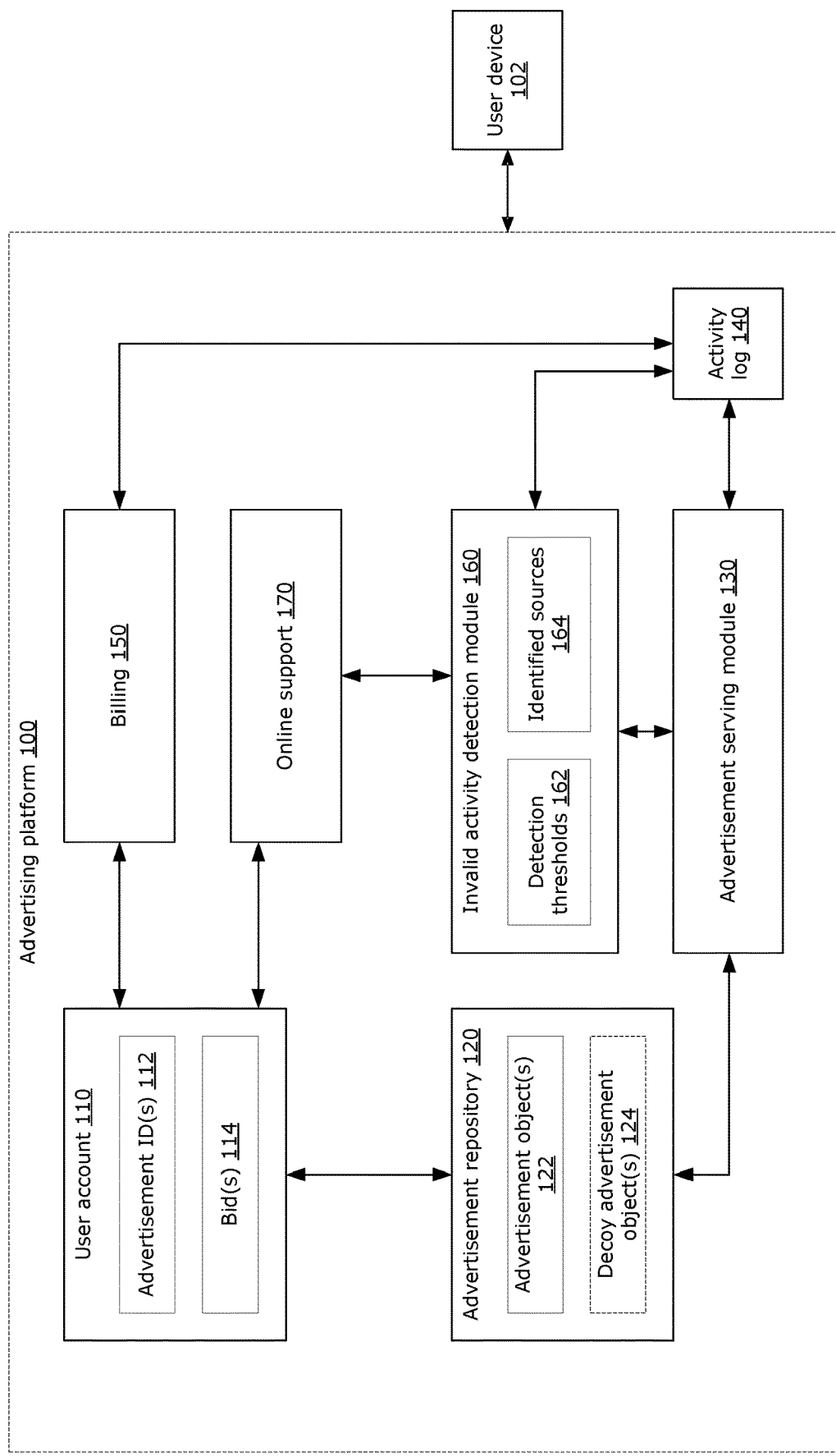
FIG. 1 is a block diagram of an example advertising platform, in which examples described herein may be implemented.

FIG. 1 is a block diagram illustrating an example advertising platform 100, in which examples disclosed herein may be implemented. In the context of the present disclosure, an advertising platform 100 may be defined as an environment (e.g., providing processor resources, memory, etc.) via which advertisers may purchase advertising space to display advertisements to a user (who may be a potential customer). In the present disclosure, an advertiser may be a client of the advertising platform 100 that bids on one or more advertising opportunities on the advertising platform 100 to serve an advertisement to a user. It should be understood that an advertiser is also a user of the advertising platform 100. For example, advertisements may be served to an advertiser.

In the present disclosure, reference is made to advertisement objects. An advertisement object is a data object that can be served as an advertisement. An advertisement object may be a real advertisement (e.g., which is part of an advertising bid and associated with a user account on the advertising platform 100) that is served in such a way that the advertisement is rendered for display to a human user, and to be actionable (e.g., clicked on) by the human user. In some examples, an advertisement object may be a decoy. The decoy advertisement object is not treated as a real advertisement by the advertising platform 100 and is not processed in the same way as a real advertisement. An advertisement object that is a decoy may be served, but not rendered for display and thus is not actionable by a human user; or an advertisement object that is a decoy may be served and rendered for viewing (e.g., similar to a real advertisement) but is processed by the advertising platform 100 in a way that is different from a real advertisement (e.g., user clicks on a served and rendered decoy advertisement may not be counted towards billing); or an advertisement object that is a decoy may be served and rendered, but is rendered in such a way that the decoy advertisement object is not expected to be viewable by a human user (e.g., is blocked from view by another rendered object) and thus is unlikely to be actionable by a human user.

The advertising platform 100 may be, or may be part of, a platform that provides other services to a user. For example, the advertising platform 100 may be embodied as a digital distribution platform (commonly referred to as an app store), as a search platform, as an e-commerce platform, or other such possibilities. For example, the advertising platform 100 may be used to serve advertisement objects to a user who is making use of services provided by a digital distribution platform (e.g., serve advertisement objects to a user who is looking to purchase an app on an app store). The advertising platform 100 is implemented using hardware resources, for example using one or more physical machines (e.g., server(s)). In some examples, the advertising platform 100 may be implemented in a distributed manner, using resources provided by a group of physical machines.

The advertising platform 100 may be an online platform that is accessible (e.g., using a user device 102) via an online portal. The advertising platform 100 maintains user accounts 110, each of which is associated with at least one advertiser that is registered on the advertising platform 100. Each user account 110 is associated with one or more advertisement identifiers (IDs) 112 and one or more bids 114. The advertisement ID(s) 112 identify respective advertisement object(s) 122 stored in an advertisement repository 120 of the advertising platform 100. A user account may submit an advertisement object 122 (e.g., via the user device 102) to be stored in the advertisement repository 120 (in some cases, the advertising platform 100 may first review and approve the advertisement object 122 before storing the advertisement object 122 in the advertisement repository 120. The advertising platform 100 may generate a unique advertisement ID 112 for the stored advertisement object 122 and associate the advertisement ID 112 with the user account that submitted the advertisement object 122. The advertisement repository 120 may optionally also store one or more decoy advertisement objects 124.

The bid 114 associated with a user account 110 is a record of a cost that the user has agreed to pay the advertising platform 100 in exchange for the advertising platform 100 serving an advertisement object 122 associated with the user account 110 (as indicated by the advertisement ID(s) 112). A given bid 114 may define one or more criteria set by the user for serving the advertisement object 122. For example, a bid 114 may specify that a given advertisement object 122 associated with the user account 110 be served to users who search for a given keyword or a given product or service category. The process of bidding for a keyword is not the focus of the present disclosure, and there are various techniques that may be used. Assuming the bid 114 is successful, the advertisement object 122 associated with the bid 114 is served to be displayed to a user when a search query for the specified keyword or category is conducted.

The auctioning of advertising space and serving of advertisement objects 122 associated with successful bids 114 may be performed by an advertisement serving module 130. In the present disclosure, a module may be a software module, which is a set of software instructions executable by a processor (or other computing hardware) to carry out the operations of the module. The advertisement serving module 130 may identify advertising opportunities that arise when a user is using services provided by the advertising platform 100 (or another platform of which the advertising platform 100 is a part). For example, an advertising opportunity may be when a user is browsing a digital distribution platform (of which the advertising platform 100 is a part), and the advertisement serving module 130 may auction off advertising space and serve advertisements to the user when the user first engages with the digital distribution platform (e.g., first opens a browser window to the digital distribution platform on the user device 102). The advertisement serving module 130 may auction off advertising space and server advertisements related to specific keywords searched by the user on the digital distribution platform, related to specific categories of products (e.g., based on application taxonomy or navigation map) navigated to by the user, and/or related to specific characteristics of products (e.g., based on defined collection of products, such as products for new businesses, or products for wholesalers, etc.) browsed by the user.

An example of how the advertisement serving module 130 may serve an advertisement object to a user is now described. For simplicity, in this example the advertising platform 100 is part of (or a partner with) another platform providing a service to the user. It should be understood that this is only exemplary and is not intended to be limiting. Further, this example has been simplified for ease of understanding. In an example, a user may submit a search query on the other platform (e.g., a digital distribution platform, a search platform, an e-commerce platform, etc.). The advertising platform 100 is used to serve an advertisement object to the user, based on keyword(s) in the search query. A request is received originating from the user device 102 (e.g., the request may be the search query itself, or may be the keyword(s) contained in the search query). The advertisement serving module 130 conducts an auction in real-time for the advertising opportunity related to the request (e.g., the opportunity to display advertisement in the advertising space next to the search results), and serves advertisement objects from winning bids. The served advertisement objects are rendered by a browser, for example, for display on the user device 102 as visual advertisements. Any interaction the user has with a displayed advertisement is activity related to the served advertisement object that can be tracked by the advertisement serving module 130. It should be understood that advertisement objects may be served in response to other types of requests, and not necessarily limited to responding to search queries. For example, other types of requests that may originate from the user device 102 may be a view event in which a webpage is viewed and an advertisement object is served to be viewed on the webpage; a navigation event in which the user navigates to a webpage related to a particular category and an advertisement object is served related to that category; or home page event in which a user navigates to a home page and an advertisement object is served related to recommendations for the user. Other such variations are possible.

The advertisement serving module 130 tracks activity related to a served advertisement object and logs the tracked activity to an activity log 140. Activity related to a served advertisement object may include a click event (e.g., a user clicks on a rendered advertisement), a view or impression event (e.g., served advertisement object is rendered for display to a user), or an install event (e.g., a software application associated with the served advertisement object is installed by a user), among other possibilities. The activity log 140 may maintain records of historical activity related to served advertisement objects over a defined period of time (e.g., for the past three months). Each record in the activity log 140 may include data identifying the served advertisement object (e.g., the advertisement ID), the type of activity related to the served advertisement object (e.g., a click event, a view event, etc.), and the source of the activity (e.g., an IP address).

Logged activity in the activity log 140 is used by a billing facility 150 of the advertising platform 100 to bill the user account 110 for served advertisement objects, in accordance with the successful bids 114 associated with the user account 110. For example, if a bid 114 is on a pay-per-click basis, then the billing facility 150 may tally the click events logged in the activity log 140 for advertisement object(s) 122 associated with a given user account 110 (as indicated by the advertisement ID(s) 112) over a defined billing period (e.g., one month) and bill the user account 110 accordingly. Similarly, if a bid 114 is on a pay-per-view basis, then the billing facility 150 may tally view/impression events logged in the activity log 140 for advertisement object(s) 122 associated with a given user account 110 over a defined billing period and bill the user account 110 accordingly. Optionally, an analytics facility (not shown) on the advertising platform 100 may analyze the activity log 140 and provide the user account 110 with a metric (e.g., a click-through rate) indicating the effectiveness of the advertisement object(s) 122 associated with the user account 110.

Activity related to served advertisement objects may include invalid activity. In general, in the context of the present disclosure, any interactions with served advertisement objects that are not by a real user having interest in the advertised product may be considered invalid activity. Invalid activity may include activity that is intentionally fraudulent or malicious (e.g., in the case of click fraud), as well as activity that is unintentionally invalid (e.g., a real interested user accidentally clicks on an advertisement twice). Invalid activity may be performed by humans, or by non-human entities such as automated computer scripts or software (commonly referred to as bots). Generally, any activity where the source of the activity is non-human may be considered to be invalid activity.

Unintentional invalid activity typically occurs randomly and/or at a low-enough level (e.g., one invalid activity logged per 1000 served advertisement objects per day on average) to be considered equivalent to background noise and/or negligible. Accordingly, some low level of invalid activity may be tolerated by the advertising platform 100.

In the case of intentional invalid activity, may be considered an attack, which may be a platform-wide attack (indiscriminate to any specific ad) or may be targeted towards certain ad(s). An attack can be carried out over the course of a shorter period of time (e.g., a burst of a few minutes) or more stealthily over a longer period of time (e.g., one invalid click even per week).

The advertising platform 100 includes an invalid activity detection module 160 to detect and mitigate invalid activity related to served advertisement objects. The invalid activity detection module 160 obtains data from the activity log 140 and performs analysis to detect invalid activity and the source of the detected invalid activity. The data obtained from the activity log may include data about real-time (or near real-time) activity, as well as historical activity. The invalid activity detection module 160 may use one or more detection thresholds 162 for detecting invalid activity and/or may change the threshold value of one or more detection thresholds 162, as discussed further below. For example, the invalid activity detection module 160 may compare the activity from a given source over a defined time period (e.g., the past three months) against the general average activity on the advertising platform 100 over the same period, to detect if activity from the given source is invalid activity. In another example, the invalid activity detection module 160 may compare current (e.g., real-time or near real-time) activity from a given source at a current or recent time (e.g., current rate of requests per minute) against the general average activity rate on the advertising platform 100. For example, if the given source is found to have a very high activity rate (e.g., over 10,000 advertising requests per minute) compared to the general average (e.g., less than one request per minute), the invalid activity detection module 160 may detect the high activity rate as invalid activity. It should be understood that various techniques for detecting invalid activity may be used (including detection based on other types of activity and/or other time frames), and the present disclosure is not necessarily limited to any specific technique for detecting invalid activity.

For example, a detection threshold 162 may define a threshold for expected activity (e.g., an expected number of click events per 1000 served advertisement objects per hour), and any activity that exceeds the detection threshold 162 is detected by the invalid activity detection module 160 as invalid activity.

A detection threshold 162 may be set based on expected normal activity levels. For example, an expected activity quantity can be determined statistically (e.g., based on a moving window, based on analysis of long-term historical data), and a detection threshold 162 may be set accordingly. There may be multiple detection thresholds 162 used by the invalid activity detection module 160. For example: there may be a platform-wide detection threshold 162 (e.g., a single IP address is expected to be the source of 50 or fewer interactions per day across all advertisement objects served by the advertising platform 100); there may be a category-specific detection threshold 162 (e.g., some a category might be expected to attract more activity or searches than less popular categories); there may be an advertiser-specific detection threshold 162 (e.g., activity related to advertisement objects belonging to one advertiser that is much higher than other similar advertisers might indicate a targeted attack by malicious competitor); there may be a keyword-specific detection threshold 162 (e.g., some keywords might be expected to attract more activity or more searches than other keywords); there may be a user-type specific detection threshold 162 (e.g., newer users might be expected to have more activity than more veteran users); and so forth.

In some examples, the invalid activity detection module 160 may dynamically switch from a first detection threshold to a second detection threshold (or may dynamically change the detection threshold from a first threshold value to a second threshold value), in real-time (or near real-time) response to user-initiated complaints logged by an online support facility 170 of the advertising platform 100. For example, the first detection threshold may enable detection of invalid activity above expected normal activity levels, and the second detection threshold may be more sensitive (e.g., set at a lower threshold value) than the first detection threshold to enable detection of invalid activity that is not detected using the first detection threshold. Further details about dynamically changing detection thresholds will be discussed further below.

The invalid activity detection module 160 may also use a rules-based approach to detect invalid activity. For example, certain activity patterns may be indicative of invalid activity, such as logged activity that is unusual (e.g., click events that are too rapid to be human, always clicking on all served advertisement objects, a given source always performing the same search query at the same time daily). Logged activity that falls into such defined patterns may be detected as invalid activity.

In some examples, the invalid activity detection module 160 may detect invalid activity by detecting any activity related to advertisement objects that are served by the advertisement serving module 130 in a way that would not be actionable by a human user. For example, the advertisement serving module 130 may serve advertisement objects that are configured to not be rendered for display, or that are configured to be rendered in such a way that they are not viewable by a human user. For example, the advertisement serving module 130 may serve advertisement objects in response to a request but the served advertisement object is configured such that a browser would not render the advertisement object for display, or that is configured such that a browser would render the advertisement object to be unviewable. Thus, any interaction with the served (but not rendered) advertisement object would be due to interaction from a non-human, such as a software algorithm that is carrying invalid activity.

In some examples, the invalid activity detection module 160 may additionally or alternatively use machine learning-based techniques to detect invalid activity. For example, the invalid activity detection module 160 may implement a trained neural network that has been trained to distinguish human interactions with advertisements from non-human interactions with advertisements.

The source (e.g., IP address) of the detected invalid activity may be logged to a list of identified sources 164, and any future activity originating from a source listed in the identified sources 164 may be automatically detected as invalid activity. The list of identified sources 164 may also be populated with known sources of invalid activity (e.g., IP addresses of known bots).

After invalid activity is detected, the invalid activity detection module 160 may query the activity log 140 for historical activity by the identified source of invalid activity, and flag (or otherwise indicate) all logged activity by the identified source as invalid activity. The billing facility 150 may use the updated information in the activity log 140 to identify any previously billed charges arising from the newly flagged invalid activity, and compensate (e.g., provide refunds) affected user accounts 110 accordingly. In some examples, analytics may also be updated so that the newly flagged invalid activity is removed from calculation of performance metrics that are reported to user accounts 110.

The invalid activity detection module 160 may manage how the advertisement serving module 130 further serves advertisement objects to an identified source of invalid activity. When further requests (e.g., search queries) are received from an identified source of invalid activity, instead of serving regular advertisement objects 122 from the advertisement repository 120, the invalid activity detection module 160 may instead operate with the advertisement serving module 130 to serve a decoy advertisement object 124 in response to the further requests. Additional details about serving decoy advertisement objects 124 will be discussed further below.

It should be appreciated that the operations performed by the advertising platform 100 to serve advertisement objects in response to requests (e.g., search queries) and to detect invalid activity should be performed in real-time or near real-time. For example, there should be negligible delay (e.g., a time delay of no more than a few 100 ms) between receiving a request and serving advertisement objects, so that a response to the request (e.g., displaying search results in response to a search query) is not delayed by the advertising platform 100. The detection of invalid activity should also be performed in real-time or near real-time (e.g., within a few 100 ms of the invalid activity being performed), so that the financial and reputational damage caused by the invalid activity is mitigated. Some existing solutions take a retroactive approach to mitigating invalid activity, by refunding affected advertisers for charges incurred due to invalid activity. However, such an approach still results in financial loss by the advertising platform 100, not to mention the lost opportunity (for both the affected advertisers and the advertising platform 100) to display advertisements to real users.

Figure 2:
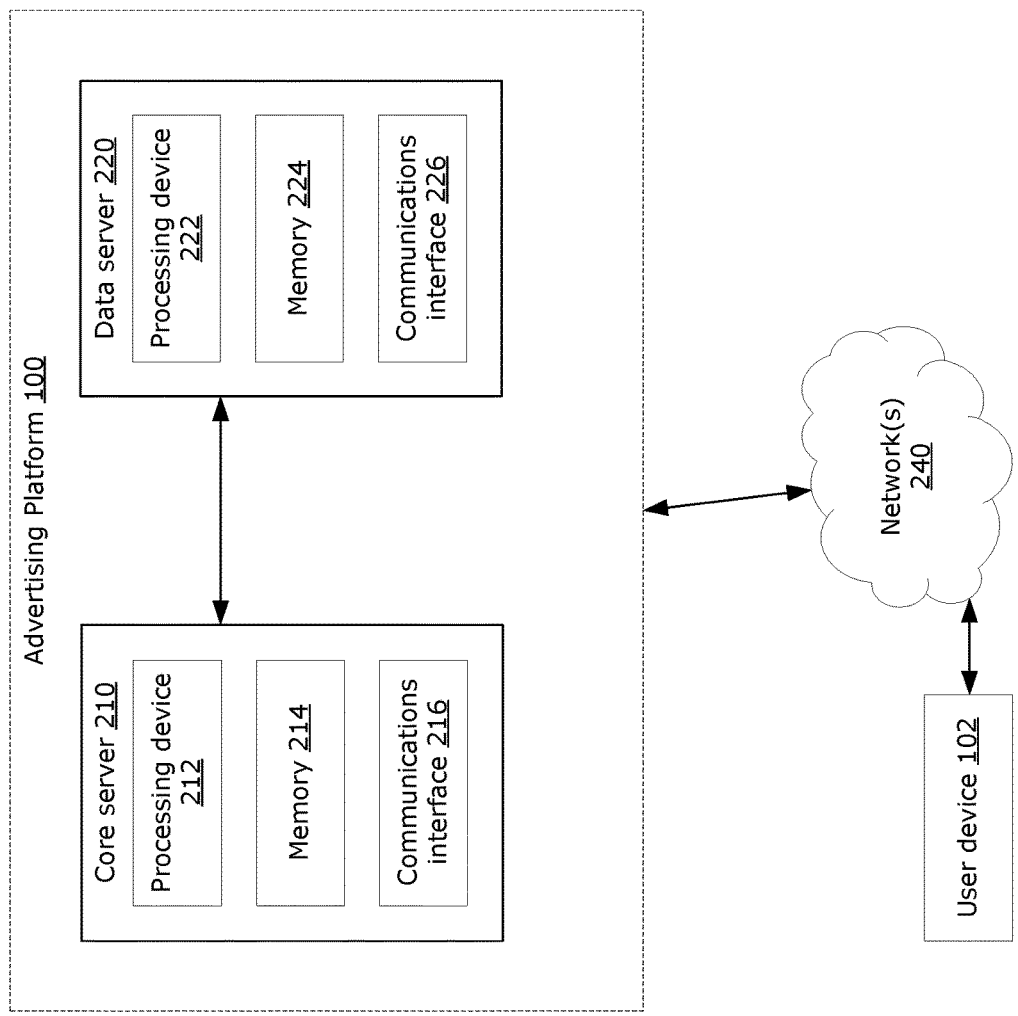
FIG. 2 is a block diagram illustrating an example implementation of the advertising platform of FIG. 1.

FIG. 2 is a block diagram of an example hardware configuration of the advertising platform 100. In this example, the advertising platform 100 is implemented using a group of servers 210, 220. However, in other examples the advertising platform 100 may be implemented using a single machine (e.g., a single server, a single desktop computing system, etc.) or may be implemented using a virtual machine that has access to a pool of resources pooled from multiple physical machines. It should be noted that different components of the advertising platform 100 may be implemented in separate hardware or software components, on a common hardware component or server or configured as a common (integrated) service or engine in the advertising platform 100. Although FIG. 2 illustrates an example hardware implementation of the advertising platform 100, it should be understood that other implementations may be possible. For example, there may be greater or fewer numbers of servers, the advertising platform 100 may be implemented in a distributed manner, or at least some of the memories may be replaced with external storage or cloud-based storage, among other possible modifications.

In the example of FIG. 2, the advertising platform 100 includes a core server 210 and a data server 220, which are each in communication with each other (e.g., via wired connections and/or via wireless intranet connections). Each of the servers 210, 220 include a respective processing device 212, 222 (each of which may be, for example, a microprocessor, graphical processing unit, digital signal processor or other computational element), a respective memory 214, 224 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 216, 226 (each of which may include transmitter, receiver and/or transceiver for wired and/or wireless communications). The core server 210 may store instructions and perform operations relevant to core capabilities of the advertising platform 100, such as serving advertisement objects and detecting invalid activity, among others. The data server 220 may be used to maintain data residing on the advertising platform 100, such as the user accounts 110 and the advertisement repository 120.

Users may, using a user device 102, access the advertising platform 100 via one or more networks 240 (e.g., wired and/or wireless networks, including a virtual private network (VPN), the Internet, and the like).

Example operation of the advertising platform 100 related to serving decoy advertisement objects in response to requests from an identified source of invalid activity is now described. A decoy advertisement object may be any advertisement object that is served in response to requests from an identified source of invalid activity, and that is processed by the advertising platform 100 in a manner that is different from regular advertisement objects that are normally served (i.e., in response to requests from other sources). The decoy advertisement object may be configured differently from regular advertisement objects.

For example, a decoy advertisement object may be an advertisement object that has a rendering configuration that causes the decoy advertisement object to not be rendered by a browser on a user device 102. In another example, a decoy advertisement object may be an advertisement object that has a rendering configuration that causes the browser on the user device 102 to render the decoy advertisement object in a manner that is unviewable (e.g., is the same color as the background of the browser page, is completely covered by another rendered object, or is rendered to be only one pixel in size) by a human user. In another example, a decoy advertisement object may be an advertisement object that has no content elements. In another example, a decoy advertisement object may be an advertisement object that has content elements but has no association with any user account 110 on the advertising platform 100 (e.g., the decoy advertisement object is a fake advertisement populated with random content by the advertising platform 100, or is a fake advertisement populated with fake content that mimics a real advertisement, or is a generic or placeholder advertisement for the advertising platform 100, among other possibilities). In another example, a decoy advertisement object may be an advertisement object that is identical to a regular advertisement object (e.g., that may have been submitted by a user account 110) except configured to be tracked by the advertising platform 100 as a decoy advertisement object. The advertising platform 100 may track any interaction with the served decoy advertisement object as invalid activity. Further, any activity related to the served decoy advertisement object is not billed to a user account 110.

Figure 3:
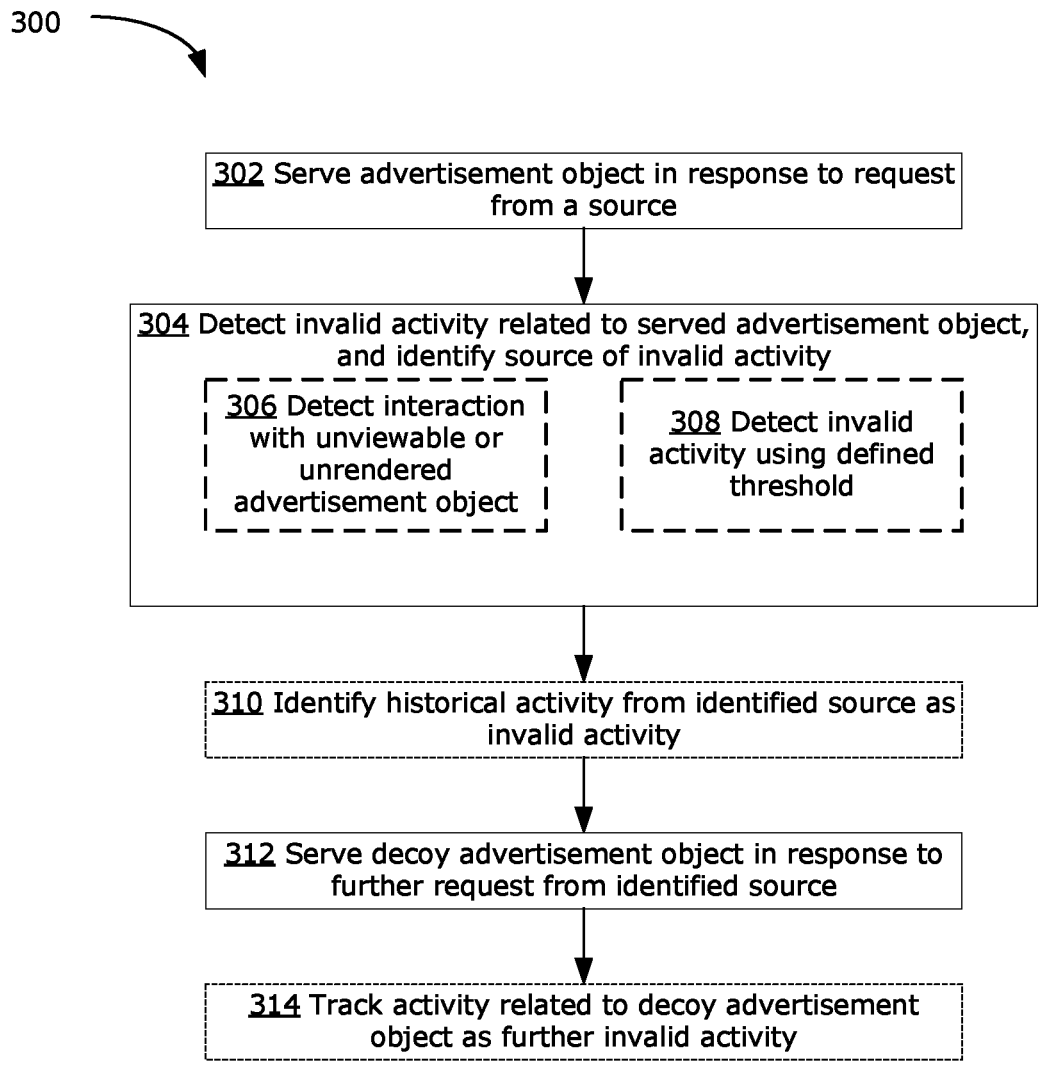
FIG. 3 is a flowchart illustrating an example method for serving advertisements objects, which may be implemented using the advertising platform of FIG. 1.

FIG. 3 is a flowchart illustrating an example method 300 for serving advertisement objects on the advertising platform 100. In particular, the example method 300 includes operations for serving decoy advertisement objects to an identified source of invalid activity. The example method 300 may be performed by the advertising platform 100 using the invalid activity detection module 160 and the advertisement serving module 130, for example.

At an operation 302, an advertisement object is served in response to a request from a source. For example, a user may submit a request such as a search query via a user device 102 to another platform, such as a digital distribution platform, search platform or e-commerce platform, that is associated with the advertising platform 100. The request is forwarded to the advertising platform 100 to enable an advertisement object to be served as part of the response to the request. For example, if the request is a search query, then the advertising platform 100 is used to serve an advertisement object related to the search query (e.g., related to keywords of the search query) together with search results.

The advertising platform 100 may serve advertisement objects in response to different requests, without being limited to search queries. In some examples, a request may not be an explicit request submitted by a user, but instead may be implied by the user's activity on the other platform. For example, if a user is browsing webpages hosted on the other platform belonging to a specific category, the request may be a view event, a navigation event or a home page event, and advertisement objects are served related to the category being viewed or navigated to, or being recommended on a home page of the user.

Although the discussion above refers to the advertising platform 100 separately from the other platform being browsed by the user, it should be understood that the advertising platform 100 may be included in the other platform. For example, a digital distribution platform, a search platform, or an e-commerce platform may include all the functionalities of the advertising platform 100 as discussed herein.

At an operation 304, invalid activity related to the served advertisement object is detected. The source of the detected invalid activity is also identified. The identified source may be added to the list of identified sources 164 by the invalid activity detection module 160. As depicted in FIG. 3 through the use of stippled lines, one or more optional operations may be employed, alone or in combination, in order to detect invalid activity. More particularly, as shown in FIG. 3, the invalid activity may be detected at the operation 304 such as, for example, by employing one or more of the operations 306 and/or 308 further described below.

For example, at an operation 306, at least one advertisement object served at operation 304 is configured to cause the advertisement object to be not rendered by a browser, or configured to cause the advertisement object to be rendered in a way that is unviewable. Various techniques may be used to perform operation 306. Any user interaction with the unrenderable or unviewable advertisement object is then detected as invalid activity, and the source of that interaction is identified as a source of invalid activity (and may be added to the list of identified sources 164).

In some examples, at least one advertisement object served at operation 304 may include configuration data that causes the advertisement object to be unrenderable by a browser, or that causes the advertisement object to be rendered in a way that is unviewable.

In some examples, at least one advertisement object may be configured by the advertisement serving module 130 to be unrenderable or unviewable after rendering. That is, a served advertisement object, which would otherwise be rendered viewable on a browser, is instead configured by the advertisement serving module 130 to be unrenderable or unviewable when rendered. An advertisement object may be configured to be not rendered by the advertisement serving module 130 serving the advertisement object in such a way that a browser at a user device would not be able to render the advertisement object for viewing. For example, the advertisement serving module 130 may serve more advertisement objects than available advertising space, with the result that at least one advertisement object cannot be rendered for viewing. In another example, the advertisement serving module 130 may add or modify configuration data to the advertisement object to indicate that the advertisement object should be hidden or otherwise unviewable when rendered.

In another example, at an operation 308, activity related to the advertisement objects served at operation 304 is detected (e.g., tracked in the activity log 140), and the detected activity is compared to a defined threshold (e.g., by the invalid activity detection module 160 using detection threshold(s) 162). Based on the comparison, invalid activity can be detected and the source of the detected invalid activity is also identified (and may be added to the list of identified sources 164). For example, a threshold may be defined based on statistics of valid activity (e.g., an average click-through rate by a real user, or an average rate of clicking by a real user), and any detected activity that exceeds this threshold may be detected as invalid activity. Other such thresholds may be defined.

For example, as discussed further below, in some instances the invalid activity detection module 160 may dynamically change the detection threshold that is used for detection of invalid activity.

Example operations 306, 308 illustrate some techniques by which the invalid activity detection module 160 may detect invalid activity related to a served advertisement object. The operations 306, 308 may be performed separately or in combination. It should be understood that other techniques may be used, in addition to or instead of the operations 306, 308. For example, invalid activity may be detected using trained machine-learning algorithms.

However the operation 304 is implemented, following the operation 304, an optional operation 310 may be next.

Optionally, at operation 310, historical activity from the identified source of invalid activity may be identified (e.g., using records maintained in the activity log 140). For example, there may have been previous activity from the identified source that was not previously detected as invalid activity (e.g., at the start of an attack, the volume of invalid activity may not exceed a defined detection threshold 162 until the attack is in full force). The activity log 140 may be updated so that any historical activity from the identified source is flagged or otherwise indicated as invalid activity.

Optionally, the advertising platform 100 may retroactively compensate for historical activity that has been updated as invalid activity. For example, the advertising platform 100 may refund affected user accounts 110 for charges related to historical activity that has been found to be invalid activity, and any affected performance metrics may be recalculated.

At an operation 312, after identifying the source of detected invalid activity, the advertising platform 100 responds to any further request from the identified source by serving at least one decoy advertisement object. For example, when the advertising platform 100 receives another request, the invalid activity detection module 160 may determine whether the source of the request is included in the list of identified sources 164, and if so then the invalid activity detection module 160 may cause the advertisement serving module 130 to serve a decoy advertisement object instead of a regular advertisement object.

As previously mentioned, a decoy advertisement object may be an advertisement object that is processed differently from regular advertisement objects. For example, a decoy advertisement object may be configured so that it is not renderable for display to a human user, is rendered to be unviewable by a human user, is not associated with a user account 110, or is randomly generated by the advertising platform 100, among other possibilities.

Optionally, at an operation 314, any activity related to the served decoy advertisement object may be tracked as further invalid activity. For example, the further invalid activity may be logged in the activity log 140 with a flag or other indicator that the activity is invalid. Alternatively, the further invalid activity may be logged in a separate log dedicated to tracking invalid activity. Tracking the known invalid activity may enable the advertising platform 100 to collect data to better understand future attacks. For example, the collection of known invalid activity may be used to generate training data for training a machine-learning algorithm to detect invalid activity.

Using the example method 300 described above, invalid activity is detected and mitigated. Instead of simply blocking the identified source of invalid activity (as may be done in typical existing solutions), the example method 300 keeps the identified source occupied by serving decoy advertisement objects. From the viewpoint of the identified source, there may be no discernible change in the served advertisement objects. In this way, the resources of the identified source are tied up by the decoy advertisement objects. The identified source may not be aware that its invalid activity has been detected, and thus may be prevented from taking actions to circumvent the detection (e.g., prevented from launching another attack using a different IP address).

Figure 4:
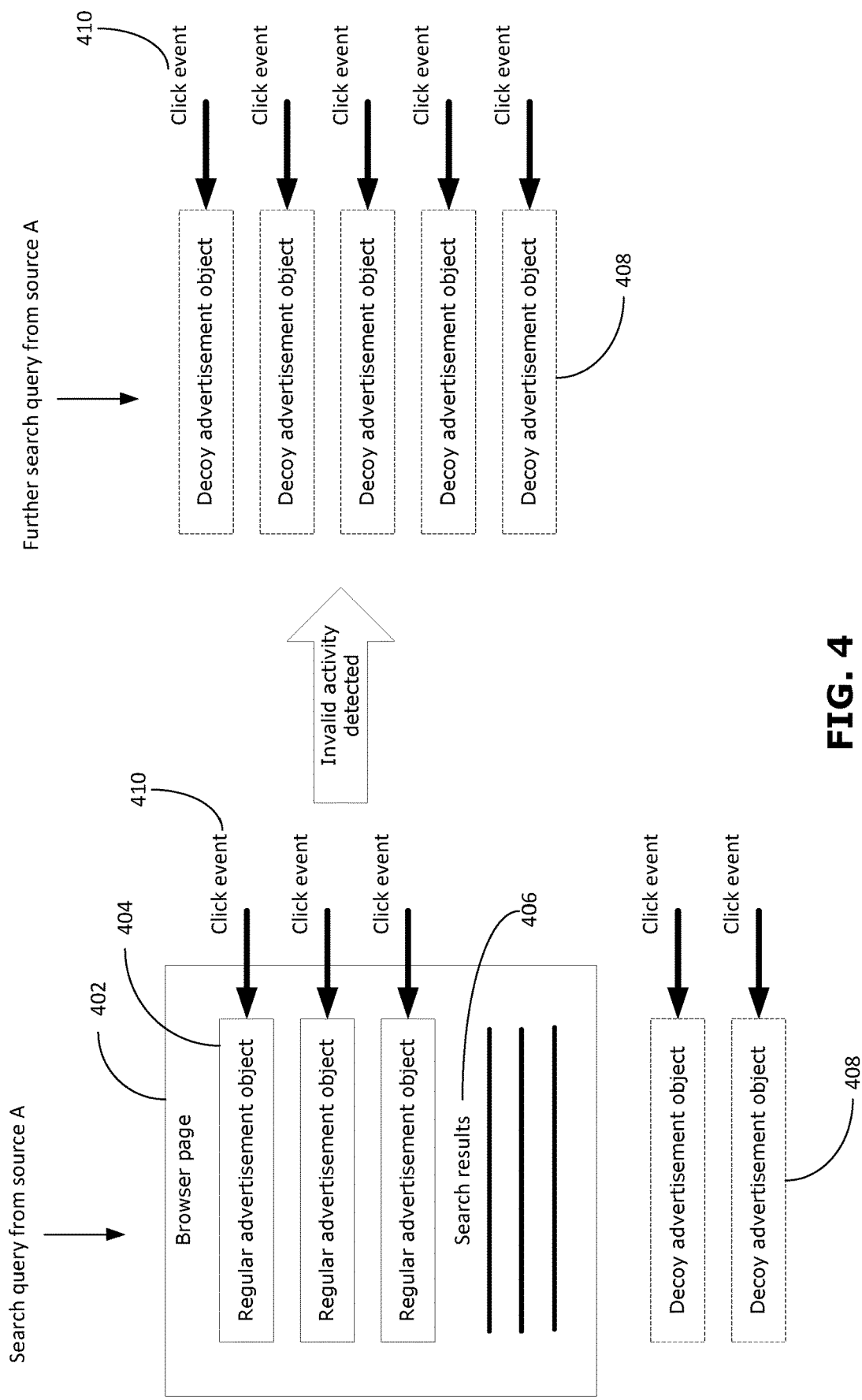
FIG. 4 illustrates a simplified example implementation of the method of FIG. 3.

FIG. 4 illustrates a simplified example implementation of the example method 300. In this example, the advertising platform 100 may be part of a digital distribution platform. A user may submit a search query to search for software applications of interest that are available for purchase on the digital distribution platform. Advertisement objects are served by the advertising platform 100 together with search results, in response to the search query.

For example, in response to a search query from a given source (in this case, source A), the advertising platform 100 serves regular advertisement objects 404 to be rendered for display in a browser page 402 (e.g., rendered by a user device 102) next to search results 406 (e.g., as described at operation 302). The advertising platform 100 may additionally serve decoy advertisement objects 408, which in this case are configured to be not rendered in the browser page 402. For example, the decoy advertisement objects 408 may be included in a response to a request but incompatible with rendering operations by the browser. The advertising platform 100 tracks activity related to the served advertisement objects, and detects activity (in this case, click events 410) for both the regular advertisement objects 404 and the decoy advertisement objects 408. Because the decoy advertisement objects 408 have not been rendered for display, the click events 410 relating to the decoy advertisement objects 408 are determined to be from a non-human source, and detected as invalid activity by the advertising platform 100 (e.g., as described at operation 306). Source A is also identified as a source of invalid activity. Subsequent to the detection of invalid activity and identification of the source, further search queries from source A are responded to by serving only decoy advertisement objects 408 (e.g., as described at operation 312). Source A may interact with the decoy advertisement objects 408 (e.g., at click events 410), which are all detected as further invalid activity by the advertising platform 100 (e.g., as described at operation 314).

Figure 5:
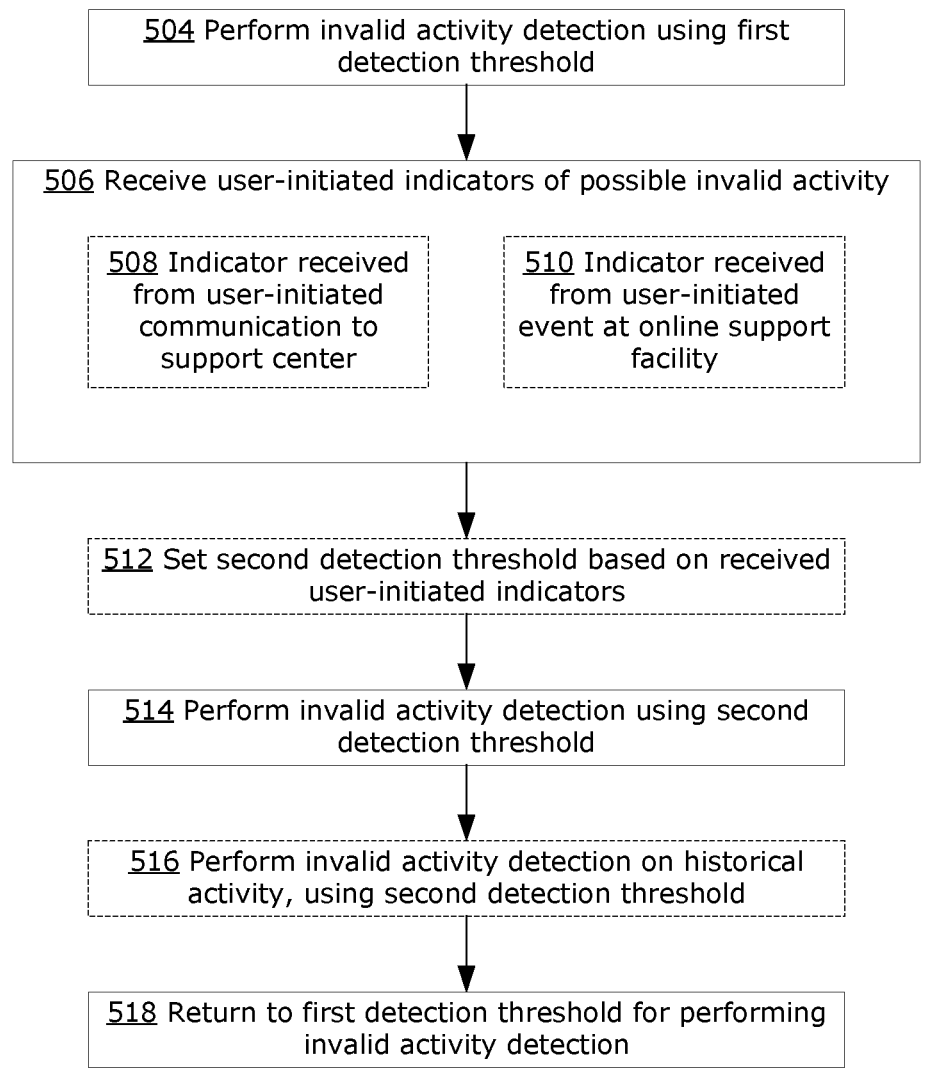
FIG. 5 is a flowchart illustrating an example method for detecting invalid activity, which may be implemented using the advertising platform of FIG. 1.

FIG. 5 is a flowchart illustrating an example method 500 for detecting invalid activity on the advertising platform 100. In particular, the example method 500 includes operations for dynamically changing detection thresholds, based on user-initiated indicators of possible invalid activity. The example method 500 may be performed by the advertising platform 100 using the invalid activity detection module 160, for example.

At an operation 504, invalid activity detection is performed by the invalid activity detection module 160 using a first detection threshold. For example, as discussed previously, the invalid activity detection module 160 may use a first detection threshold that has been defined based on statistics of historical user interaction with served advertisement objects over a defined time window (e.g., over the previous month). The first detection threshold may be defined in any other suitable way.

The operation 504 may include operations for serving advertisement objects and monitoring for invalid activity, similar to the procedure described above at operations 302 and 304 (specifically operation 304 performed using operation 308). The advertising platform 100 serves advertisement objects in response to a request from a source. Activity related to the served advertisement object served is detected, and the detected activity is compared to a first detection threshold. Any activity that fails the first detection threshold (e.g., exceeds the first detection threshold) may be detected as invalid activity and the source of the detected invalid activity may be identified. The invalid activity detection module 160 may not detect any invalid activity using the first detection threshold.

At an operation 506, user-initiated indicators of possible invalid activity are received. The user-initiated indicators may originate from different user accounts 110 on the advertising platform 100, and in different forms, some of which are discussed below. As depicted in FIG. 5 through the use of stippled lines, one or more optional operations may be employed, alone or in combination, in order to receive user-initiated indicators of possible invalid activity. More particularly, as shown in FIG. 5, the user-initiated indicators may be received at the operation 506 such as, for example, by employing one or more of the operations 508 and/or 310 further described below.

For example, at an operation 508, a received user-initiated indicator may be a user-initiated communication to a support center providing help support for the advertising platform 100. A user may contact (e.g., via email, telephone call, etc.) the support center about a suspected attack against the user's advertising. This user-initiated communication to the support center may be logged (e.g., as a support ticket) and associated with the user's user account 110.

In another example, at an operation 510, a received user-initiated indicator may be a user-initiated event at the online support facility 170. For example, the advertising platform 100 may provide self-help functionality via the online support facility 170, such as in the form of searchable help pages, online help request forms, and such. A user-initiated event may be a user-initiated search related to invalid activity (e.g., a search query containing the keyword "click fraud"), a user-initiated view of a help page related to invalid activity (e.g., a help page about how to obtain a refund for click fraud), or a user-initiated online submission of a help request. In some examples, the online support facility 170 may categorize submitted help requests (e.g., using natural language processing algorithms) to identify whether a submitted help request is related to possible invalid activity. The online support facility 170 may also identify the user account 110 originating the user-initiated event.

Example operations 508, 510 illustrate some techniques by which user-initiated indicators of possible invalid activity may be received. The operations 508, 510 may be performed separately or in any combination. It should be understood that other techniques may be used, in addition to or instead of the operations 508, 510.

User-initiated indicators may be monitored across all user accounts 110 registered on the advertising platform 100. Different types of user-initiated indicators may be received from different user accounts 110, and may be analyzed together by the invalid activity detection module 160. For example, user-initiated indicators may be received over different channels (e.g., over online help request forms, over online searches, over the support facility 170, etc.), which may all be combined for analysis by the invalid activity detection module 160. Generally, the greater the number of different user accounts 110 originating the user-initiated indicators, the greater the likelihood there is a need to improve detection of invalid activity. For example, if different user-initiated indicators originate from only one user account 110, it may be that the user associated with that user account 110 is simply curious about invalid activity. Further, it may be expected that there will always be some low number of user accounts 110 that will search for help related to invalid activity even if there is none (e.g., some small number of user accounts 110 may be associated with users who are overly suspicious), and this may be simply considered a baseline number of user-initiated indicators (or "background noise"). However, if a larger number of user accounts 110 (e.g., higher than a usual baseline number) originate user-initiated indicators, this may indicate a high likelihood that there is actual invalid activity on the advertising platform 100.

The method 500 may proceed to optional operation 512 or operation 514 only after a sufficient number of user-initiated indicators have been received. For example, if only one user-initiated indicator is received, the advertising platform 100 may not find this to be a reliable indicator of possible invalid activity. However, if a larger number of user-initiated indicators is received (e.g., more than 20), and/or if the received user-initiated indicators all share a common characteristic (e.g., all related to the same advertising keyword), the advertising platform may find this to be a reliable indicator of possible invalid activity, and may determine that a more sensitive detection threshold should be used. Accordingly, the detection threshold for performing invalid activity detection may be changed, from the first detection threshold to a second detection threshold that is more sensitive than the first detection threshold. It should be understood that, throughout the present disclosure, changing the threshold value for the first detection threshold itself may be performed instead of changing from the first detection threshold to the second detection threshold.

Optional operation 512 follows the operation 506. At optional operation 512, the invalid activity detection module 160 may set the second detection threshold based on the user-initiated indicators received at operation 560. Generally, the second detection threshold should be set to be more sensitive to possible invalid activity than the first detection threshold. For example, if the first detection threshold has a first threshold value that must be exceeded in order for invalid activity to be detected, the second detection threshold may be set to have a lower second threshold value. For example, the second threshold value of the second detection threshold may be set proportional to the amount of received user-initiated indicators (e.g., the greater the number of received user-initiated indicators, the lower the second threshold value).

In some examples, the second detection threshold may be set based on characteristics of the user accounts 110 originating the user-initiated indicators. For example, clustering techniques (or other grouping techniques) may be used to identify a common characteristic among some or all of the user accounts 110. A common characteristic may be, for example, a common keyword included in bids by the user accounts 110, a common product category bid on by the user accounts 110, a common user profile characteristic (e.g., geographic region, commercial industry, etc.) included in the user accounts 110, among others. The user accounts 110 may also be cross-referenced with historical activity logged in the activity log 140 to identify whether advertisement objects associated with the user accounts 110 have been subject to activity from a common source. If a common characteristic is found among some (e.g., at least a majority) of the user accounts 110 that originated the user-initiated indicators, there is a likelihood that there is possible invalid activity specific to that common characteristic (e.g., an attack is being carried out against a specific advertising keyword). In such a scenario, the second detection threshold may be set for detecting possible invalid activity associated with the common characteristic.

At an operation 514, invalid activity detection is performed using the second detection threshold. In some examples, the second detection threshold may be used for invalid activity detection similarly to detection using the first detection threshold. That is, the invalid activity detection module 160 may use the second detection threshold in place of the first detection threshold, and monitor activity related to served advertisement objects by comparing against the second detection threshold.

In some examples, the second detection threshold may be used for monitoring only a subset of activity related to served advertisement objects. For example, if a common characteristic was identified at optional operation 512, the second detection threshold may be used for monitoring activity related to only that common characteristic. For example, a common characteristic may be a specific advertising keyword and the second detection threshold may be used only for detection of possible invalid activity related to advertisement objects that are served for that specific advertising keyword. The first detection threshold may remain in use for detection of possible invalid activity related to advertisement objects that are served for other advertising keywords.

Because the second detection threshold is more sensitive than the first detection threshold, invalid activity detection using the second detection threshold may enable detection of invalid activity that is not detected using the first detection threshold.

Optionally, at an operation 516, the second detection threshold may be used to retroactively perform invalid activity detection on historical activity (e.g., using records maintained in the activity log 140). For example, the second detection threshold may be used to detect possible invalid activity over a defined historical period (e.g., over the past week, over the past month, or longer), which may have been undetected using the first detection threshold. The historical activity over the defined historical period may be compared against the second detection threshold to detect any invalid activity.

In some examples, if the second detection threshold was set based on a common characteristic, the second detection threshold may be used to retroactively perform invalid activity detection on historical activity related to that common characteristic. For example, if the second detection threshold was set for a common advertising keyword, then the activity log 140 may be queried for a subset of historical activity related to advertisement objects that were served for that common advertising keyword and the subset of historical activity may be compared against the second detection threshold.

If any invalid activity is detected, whether from operation 514 or from optional operation 516, the source of the detected invalid activity is identified as a source of invalid activity. The identified source may be added to the list of identified sources 164. Further operations may be performed subsequent to identifying a source of invalid activity, such as identifying additional historical activity from the identified source as invalid activity (e.g., similar to operation 310 described above), or serving decoy advertisement objects in response to further requests from the identified source (e.g., similar to operation 312 described above). Operations that may be performed subsequent to identifying a source of invalid activity have been described previously and need not be repeated in detail here.

At an operation 518, after a defined period of time, the invalid activity detection module 160 returns to using the first detection threshold for performing invalid activity detection. For example, the invalid activity detection module 160 may return to using the first detection threshold after the second detection threshold has been in use for a defined time period, after no more user-initiated indicators have been received for a defined time period, after user-initiated indicators have been at decreased numbers (e.g., no more than a baseline number) for a defined time period, after there is no further activity from the identified source for a defined time period, among other possibilities. The defined period of time may be, for example, a week, or a month. It should be noted that the first detection threshold to which the invalid activity detection module 160 returns may be itself an adjusted detection threshold (e.g., based on some other user-initiated indicators related to a different common characteristic). For example, a first detection threshold may be adjusted to a second detection threshold based on user-initiated indicators associated with a particular common advertising keyword, then the detection threshold may be further adjusted to a third detection threshold based on user-initiated indicators associated with a particular common product category. Sometime later (e.g., after one hour), there is no further invalid activity detected associated with the particular product category, but the invalid activity is still detected associated with the particular advertising keyword. Accordingly, the invalid activity detection module 160 returns to the second detection threshold (which is itself an adjusted detection threshold). It should also be understood that the second detection threshold may not be derived from user-initiated indicators. Other such scenarios may be possible within the scope of the present disclosure.

The return to the first detection threshold may be a switch from using the second detection threshold back to using the first detection threshold. Alternatively, the return to the first detection threshold may be a gradual transition (e.g., a linear ramp or a logarithmic ramp) from the second threshold value of the second detection threshold to the first threshold value of the first detection threshold. If, during the gradual transition back to the first detection threshold, user-initiated indicators are received again (or are received at increased numbers), the invalid activity detection module 160 may abruptly or gradually switch back to using the second detection threshold.

Further, if, during the time period when the second detection threshold is in use for invalid activity detection, user-initiated indicators of possible invalid activity continue to be received (or are received at increased numbers), the invalid activity detection module 160 may dynamically change to a third detection threshold that is even more sensitive than the second detection threshold. Thus, the method 500 may be performed continuously to dynamically change detection thresholds to be more (or less) sensitive, based on received user-initiated indicators of possible invalid activity.

The example method 500 described above enables a more dynamic manner of detecting invalid activity. The detection threshold may be dynamically changed to be more sensitive, in response to user-initiated indicators of possible invalid activity. In particular, the detection threshold may be dynamically changed based on indicators originating from multiple user accounts. Generally, it is not desirable to always use a detection threshold that is more sensitive, because there will be greater numbers of false positives (i.e., valid activity that is erroneously detected as invalid activity). Having excessive false positives is undesirable because the result is that performance metrics may be skewed, and the advertising platform may not be able to charge for serving the advertisement object. However, it is also not desirable for invalid activity to continue undetected. This is particularly important in the case of malicious entities who may (e.g., through trial-and-error or systematically) determine the threshold value that is being used for invalid activity detection. Such a malicious entity may then carry out an attack that is designed to be just under the detection threshold but still significant enough to incur financial damage to affected user accounts.

In the example method 500, indicators from multiple user accounts, rather than just one user account, are used as the basis for dynamically changing the detection threshold. By monitoring user-initiated indicators of possible invalid activity across multiple accounts on the advertising platform, and optionally identifying common characteristics from the user-initiated indicators, the method 500 enables the advertising platform to use a more sensitive detection threshold when appropriate, and optionally to target the use of a more sensitive detection threshold only for a specific subset of activity.

Figure 6:
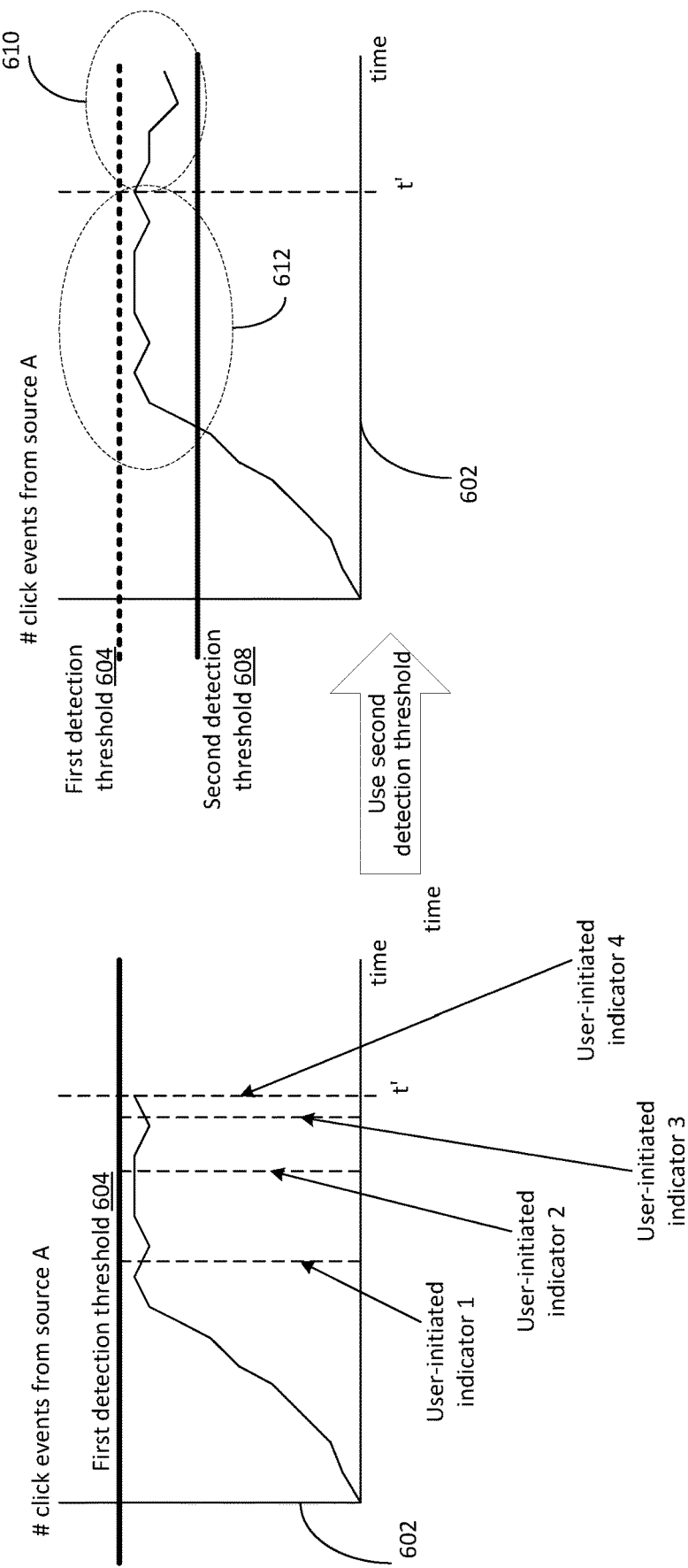
FIG. 6 illustrates a simplified example implementation of the method of FIG. 5.

FIG. 6 illustrates a simplified example implementation of the example method 500. In this example, click events from a source (namely, source A) are tracked over time (represented by a graph 602). The click events are compared against a first detection threshold 604 to detect for possible invalid activity (e.g., as described at operation 504). In this example, the number of click events from source A is below the threshold value of the first detection threshold 604 and are not detected as invalid activity.

A user-initiated indicator from a first user account (indicated in FIG. 6 as user-initiated indicator 1) is received at a first time. Additional user-initiated indicators from second, third and fourth user accounts (indicated in FIG. 6 as user-initiated indicators 2, 3 and 4) are further received at later times (e.g., as described at operation 506). When sufficient user-initiated indicators have been received (e.g., when user-initiated indicator 4 is received at time t'), the invalid activity detection is dynamically changed to use a second detection threshold 608, which is more sensitive than the first detection threshold 604. As shown in FIG. 6, the second detection threshold 608 has a lower threshold value than the first detection threshold 604. Further activity (indicated by dashed circle 610) from source A is detected as invalid activity, using the second detection threshold 608 (e.g., as described at operation 514). Historical activity (indicated by dashed circuit 612) is also retroactively compared against the second detection threshold 608 (e.g., as described at operation 516), to detect historical instances of invalid activity that were previously undetected using the first detection threshold 604. At some future time (not shown), invalid activity detection returns to using the first detection threshold 604.

It should be understood that example method 300 and example method 500 may be performed together in combination. For example, the method 300 may make use of dynamically changeable detection thresholds for detecting invalid activity (e.g., at operation 304). Similarly, the method 500 may serve decoy advertisement objects to an identified source of invalid activity (e.g., following operation 514). The advertising platform 100 may perform the method 300 and the method 500 independently of each other, and may also perform the methods 300 and 500 together as a single method or process.

Figure 7:
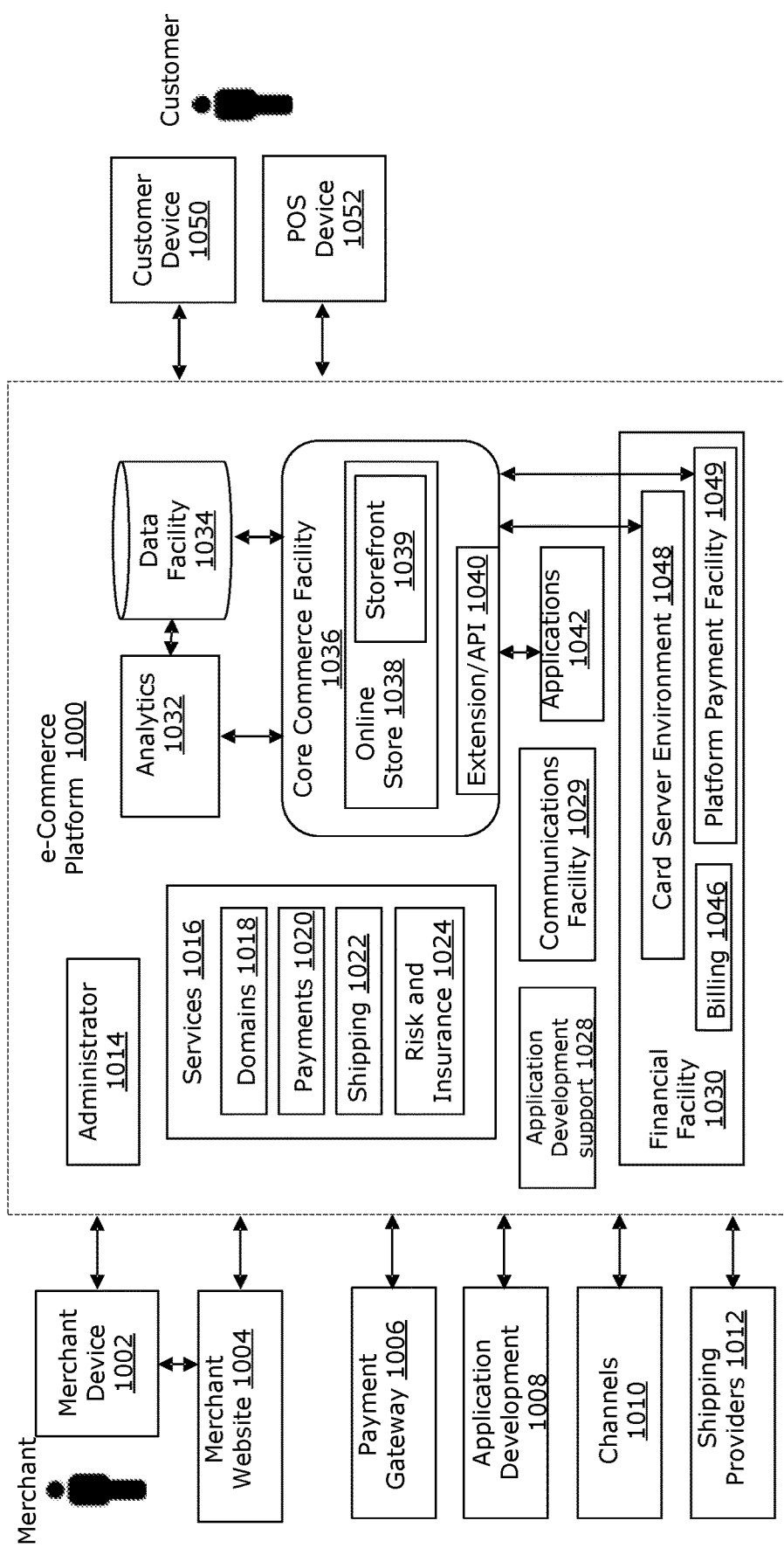
FIG. 7 is a block diagram of an example e-commerce platform, which may include the advertising platform of FIG. 1.

As previously mentioned, in some examples the advertising platform 100 may be part of (or may cooperate with) an e-commerce platform, though this is not required. With reference to FIG. 7, an example embodiment of an e-commerce platform 1000 is depicted. The e-commerce platform 1000 may implement examples described herein. For example, the e-commerce platform 1000 may include functionality for performing searches and for serving advertisement objects in response to search queries. The e-commerce platform 1000 may enable merchants to provide products and services to customers, and may enable merchants to search for software applications to install for online stores. Accordingly, the e-commerce platform 1000 may also be (or may include) a digital distribution platform with searching and browsing functionality. The e-commerce platform 1000 may enable business-to-business (B2B) commercial transactions, for example between wholesale suppliers and retailers. The e-commerce platform 1000 may also be referred to as a fulfillment platform and may be used to manage inventory over a network of physical warehouses.

In the context of the e-commerce platform 1000, a user to whom an advertisement object is served (e.g., as discussed above) may also be referred to as a customer, a merchant, a supplier or a retailer, among other terminology. Accordingly, references to a merchant device or a customer device may be understood to mean a user device. All references to customers, suppliers, retailers, and merchants should also be understood to be references to groups of individuals, companies, corporations, computing entities, and the like, and may represent for-profit or not-for-profit exchange of products. All references to users throughout this disclosure should also be understood to be non-specific to any role within a transaction. For example, a user may be a supplier-user (e.g., a B2B seller, wholesaler, or B2B provider of products), a retailer-user (e.g., a seller, retailer, or provider of products), or a customer-user (e.g., a buyer, purchase agent, or user of products), a prospective user (e.g., a user browsing and not yet committed to a purchase, a user evaluating the e-commerce platform 1000 for potential use in marketing and selling products, and the like), a service provider user (e.g., a shipping provider 1012, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a corporate user may also be a customer.

The e-commerce platform 1000 may provide a centralized system for providing merchants with online resources for managing their business. Merchants may utilize the e-commerce platform 1000 for managing commerce with customers, such as by implementing an e-commerce experience with customers through an online store 1038, through channels 1010, through point of sale (POS) devices 1052 in physical locations (e.g., a physical storefront or other location such as through a kiosk, terminal, reader, printer, 3D printer, and the like), by managing their business through the e-commerce platform 1000, by interacting with customers through a communications facility 1029 of the e-commerce platform 1000, or any combination thereof. A merchant may sell products through both physical storefronts and the virtual storefront 1039 of the online store 1038.

The e-commerce platform 1000 may also provide a centralized system for enabling B2B transactions between retailers and suppliers. Suppliers may, using a supplier device (not shown) for example, manage commerce with retailers in a manner similar to how retailers manage commerce with customers. For example, suppliers may manage an online store 1038 that is accessible to retailers. For simplicity, the following discussion will be in the context of an online store 1038 associated with a merchant, however it should be understood that the discussion may be applicable to both retailers and suppliers.

The online store 1038 may represent a multitenant facility comprising a plurality of virtual storefronts 1039. In various embodiments, merchants may manage one or more storefronts 1039 in the online store 1038, such as through a merchant device 1002 (e.g., computer, laptop computer, mobile computing device, and the like), and offer products to customers through a number of different channels 1010 (e.g., an online store 1038; a physical storefront through a POS device 1052; electronic marketplace, through an electronic buy button integrated into a website or social media channel such as on a social network, social media page, social media messaging system; and the like). A merchant may sell across channels 1010 and then manage their sales through the e-commerce platform 1000. A merchant may sell in their physical retail store, at pop ups, through wholesale, over the phone, and the like, and then manage their sales through the e-commerce platform 1000. A merchant may employ all or any combination of these, such as maintaining a business through a physical storefront utilizing POS devices 1052, maintaining a virtual storefront 1039 through the online store 1038, and utilizing the communications facility 1029 to leverage customer interactions and analytics 1032 to improve the probability of sales, for example.

In various embodiments, a customer may interact through a customer device 1050 (e.g., computer, laptop computer, mobile computing device, and the like), a POS device 1052 (e.g., retail device, a kiosk, an automated checkout system, and the like), or any other commerce interface device known in the art. The e-commerce platform 1000 may enable merchants to reach customers through the online store 1038, through POS devices 1052 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, the e-commerce platform 1000 may be implemented through a processing facility including a processor and a memory, the processing facility storing a set of instructions that, when executed, cause the e-commerce platform 1000 to perform the e-commerce and support functions (e.g., serving advertisement objects and detecting invalid activity related to served advertisement objects) as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 1000, merchant devices 1002, payment gateways 1006, application development 1008, channels 1010, shipping providers 1012, customer devices 1050, POS devices 1052, and the like. The e-commerce platform 1000 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices 1052, and the like). In various embodiments, elements of the e-commerce platform 1000 may be implemented to operate on various platforms and operating systems, such as iOS, Android, over the internet, and the like.

In various embodiments, storefronts 1039 may be served by the e-commerce platform 1000 to customers (e.g., via customer devices 1050), where customers can browse and purchase the various products available (e.g., add them to a cart, purchase immediately through a buy-button, and the like). Storefronts 1039 may be served to customers in a transparent fashion without customers necessarily being aware that it is being provided through the e-commerce platform 1000 (rather than directly from the merchant). Merchants may use a merchant configurable domain name, a customizable HTML theme, and the like, to customize their storefront 1039. Merchants may customize the look and feel of their website through a theme system, such as where merchants can select and change the look and feel of their storefront 1039 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 1039 and/or website 1004, such as through blogs, articles, and the like, as well as configure navigation menus. Merchants may upload images (e.g., for products), video, content, data, and the like to the e-commerce platform 1000, such as for storage by the system. In various embodiments, the e-commerce platform 1000 may provide functions for resizing images, associating an image with a product, adding and associating text with an image, adding an image for a new product variant, protecting images, and the like.

As described herein, the e-commerce platform 1000 may provide merchants with transactional facilities for products through a number of different channels 1010, including the online store 1038, over the telephone, as well as through physical POS devices 1052 as described herein. The e-commerce platform 1000 may provide business support services 1016, an administrator component 1014, and the like associated with running an on-line business, such as providing a domain service 1018 associated with their online store, payments services 1020 for facilitating transactions with a customer, shipping services 1022 for providing customer shipping options for purchased products, risk and insurance services 1024 associated with product protection and liability, merchant billing services 046, and the like. Services 1016 may be provided via the e-commerce platform 1000 or in association with external facilities, such as through a payment gateway 1006 for payment processing, shipping providers 1012 for expediting the shipment of products, and the like.

In various embodiments, the e-commerce platform 1000 may provide for integrated shipping services 1022 (e.g., through an e-commerce platform shipping facility or through a third-party shipping carrier), such as providing merchants with real-time updates, tracking, automatic rate calculation, bulk order preparation, label printing, and the like.

Figure 8:
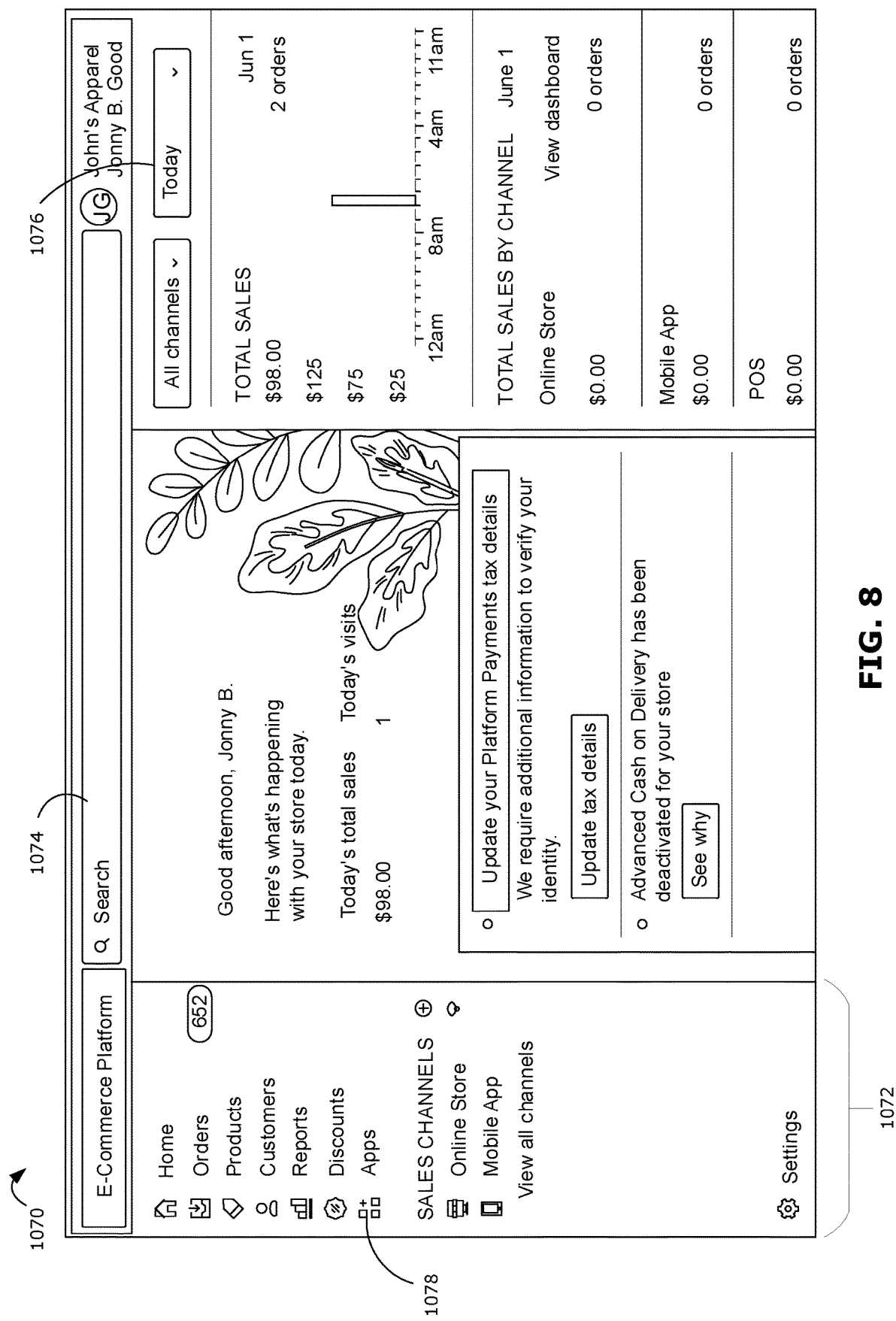
FIG. 8 is an example homepage of an administrator, which may be accessed via the e-commerce platform of FIG. 7.

FIG. 8 depicts a non-limiting embodiment for a home page 1070 of an administrator 1014, which may show information about daily tasks, a store's recent activity, and the next steps a merchant can take to build their business. In various embodiments, a merchant may log in to administrator 1014, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 1014 by using the sidebar 1072, such as shown on FIG. 8. Sections of the administrator may include core aspects of a merchant's business, including orders, products, and customers; sales channels, including the online store, POS, and buy button; applications installed on the merchant's account; settings applied to a merchant's storefront 1039 and account. Depending on the device the merchant is using, they may be enabled for different functionality through the administrator 1014. For instance, if a merchant logs in to the administrator 1014 from a browser, they may be able to manage all aspects of their storefront 1039. If the merchant logs in from their mobile device, they may be able to view all or a subset of the aspects of their storefront 1039, such as viewing the storefront's recent activity, updating the storefront's catalog, managing orders, and the like.

More detailed information about commerce and visitors to a merchant's storefront 1039 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. In some examples, performance metrics about the merchant's marketing may also be available via the home page 1070. For example, performance metrics may provide information about the success rate of a marketing plan, such as the click-through rate of successful advertising bids. The merchant may be able to view sales data for different channels 1010 from different periods of time (e.g., days, weeks, months, and the like), such as by using drop-down menus 1076. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's storefront 1039, such as based on account status, growth, recent customer activity, and the like. Notifications may be provided to assist a merchant with navigating through a process, such as capturing a payment, marking an order as fulfilled, archiving an order that is complete, and the like.

A merchant may use a search bar 1074 to find products, pages, or other information. The search bar 1074 may be used to search for self-help information, such as help pages provided via an online support facility of the e-commerce platform 1000. The search bar 1074 may also be used to search for software applications (e.g., third-party software applications) that may be installed to provide additional functionality. The sidebar 1072 may provide a selectable option 1078 to manage software applications currently installed and optionally to browse or search for other software applications that may be installed.

Reference is made back to FIG. 7. The e-commerce platform 1000 may provide for a communications facility 1029 and associated merchant interface for providing electronic communications and marketing, such as utilizing an electronic messaging aggregation facility (not shown) for collecting and analyzing communication interactions between merchants, customers, merchant devices 1002, customer devices 1050, POS devices 1052, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 1029 analyzes the interaction and provides analysis to the merchant on how to improve the probability for a sale.

The e-commerce platform 1000 may provide a financial facility 1030 for secure financial transactions with customers, such as through a secure card server environment 1048. The e-commerce platform 1000 may store credit card information, such as in payment card industry data (PCI) environments (e.g., a card server), to reconcile financials, bill merchants, perform automated clearing house (ACH) transfers between an e-commerce platform 1000 financial institution account and a merchant's bank account (e.g., when using capital), and the like. These systems may have Sarbanes-Oxley Act (SOX) compliance and a high level of diligence required in their development and operation. The financial facility 1030 may also provide merchants with financial support, such as through the lending of capital (e.g., lending funds, cash advances, and the like) and provision of insurance. The e-commerce platform 1000 may also bill a merchant using the financial facility 1030, for example in the case where the merchant is using advertising services provided by the e-commerce platform 1000 to serve merchants' advertisements. In addition, the e-commerce platform 1000 may provide for a set of marketing and partner services and control the relationship between the e-commerce platform 1000 and partners. They also may connect and onboard new merchants with the e-commerce platform 1000. These services may enable merchant growth by making it easier for merchants to work across the e-commerce platform 1000. Through these services, merchants may be provided help facilities via the e-commerce platform 1000.

In various embodiments, online store 1038 may support a great number of independently administered storefronts 1039 and process a large volume of transactional data on a daily basis for a variety of products. Transactional data may include customer contact information, billing information, shipping information, information on products purchased, information on services rendered, and any other information associated with business through the e-commerce platform 1000. In various embodiments, the e-commerce platform 1000 may store this data in a data facility 1034. The transactional data may be processed to produce analytics 1032, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 1000 may store information about business and merchant transactions, and the data facility 1034 may have many ways of enhancing, contributing, refining, and extracting data, where over time the collected data may enable improvements to aspects of the e-commerce platform 1000.

In various embodiments, the e-commerce platform 1000 may be configured with a core commerce facility 1036 for content management and task automation to enable support and services to the plurality of storefronts 1039 (e.g., related to products, inventory, customers, orders, collaboration, suppliers, reports, financials, risk and fraud, and the like), but be extensible through applications 1042 that enable greater flexibility and custom processes required for accommodating an ever-growing variety of merchant storefronts 1039, POS devices 1052, products, and services. For instance, the core commerce facility 1036 may be configured for flexibility and scalability through portioning (e.g., sharding) of functions and data, such as by customer identifier, order identifier, storefront identifier, and the like. The core commerce facility 1036 may accommodate store-specific business logic and a web administrator. The online store 1038 may represent a channel, be embedded within the core commerce facility 1036, provide a set of support and debug tools that support uses for merchants, and the like. The core commerce facility 1036 may provide centralized management of critical data for storefronts 039.

The core commerce facility 1036 includes base or "core" functions of the e-commerce platform 1000, and as such, as described herein, not all functions supporting storefronts 1039 may be appropriate for inclusion. For instance, functions for inclusion into the core commerce facility 1036 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront "isolation principle", where code should not be able to interact with multiple storefronts at a time, ensuring that storefronts cannot access each other's data), provide a transactional workload, and the like. Maintaining control of what functions are implemented may enable the core commerce facility 1036 to remain responsive, as many required features are either served directly by the core commerce facility 1036 or enabled by its extension/application programming interface (API) 1040 connection to applications 1042. If care is not given to restricting functionality in the core commerce facility 1036, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 1036 may be configured to maintain responsiveness, such as through configuration that utilizes timeouts, queues, back-pressure to prevent degradation, and the like.

Although isolating storefront data is important to maintaining data privacy between storefronts 1039 and merchants, there may be reasons for collecting and using cross-store data, such as for example, with an order risk assessment system or a platform payment facility, both of which require information from a majority of storefronts 1039 to perform well. In various embodiments, rather than violating the isolation principle, it may be preferred to move these components out of the core commerce facility 1036 and into their own infrastructure within the e-commerce platform 1000. For example, the data facility 1034 and analytics 1032 may be located outside the core commerce facility 1036.

In various embodiments, the e-commerce platform 1000 may provide for a platform payment facility 1049, which is another example of a component that utilizes data from the core commerce facility 1038 but may be located outside so as to not violate the isolation principle. The platform payment facility 1049 may allow customers interacting with storefronts 1039 to have their payment information stored safely by the core commerce facility 1036 such that they only have to enter it once. When a customer visits a different storefront 1039, even if they've never been there before, the platform payment facility 1049 may recall their information to enable a more rapid and correct check out. This may provide a cross-platform network effect, where the e-commerce platform 1000 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 1039. It would be difficult and error prone for each storefront 1039 to be able to connect to any other storefront 1039 to directly retrieve the payment information stored there. As a result, the platform payment facility 1049 may be implemented external to the core commerce facility 1036.

For those functions that are not included within the core commerce facility 1038, applications 1042 provide a way to add features to the e-commerce platform 1000. Applications 1042 may be able to access and modify data on a merchant's storefront 1039, perform tasks through the administrator 1014, create new flows for a merchant through a user interface (e.g., that is surfaced through extensions/API 1040), and the like. Merchants may be enabled to discover and install applications 1042 through application searching 1108 and application recommendations 1110 (see FIG. 9). In various embodiments, core products, core extension points, applications, and the administrator 1014 may be developed to work together. For instance, application extension points may be built inside the administrator 1014 so that core features may be extended by way of applications 1042, which may deliver functionality to a merchant through the extension/API 1040.

In various embodiments, applications 1042 may deliver functionality to a merchant through the extension/API 1040, such as where an application 1042 is able to surface transaction data to a merchant (e.g., App: "Surface my app in mobile and web admin using the embedded app SDK"), and/or where the core commerce facility 1036 is able to ask the application to perform work on demand (core: "App, give me a local tax calculation for this checkout").

Applications 1042 may support storefronts 1039 and channels 1010, provide merchant support, integrate with other services, and the like. Where the core commerce facility 1036 may provide the foundation of services to the storefront 1039, the applications 1042 may provide a way for merchants to satisfy specific and sometimes unique needs. Different merchants will have different needs, and so may benefit from different applications 1042. Applications 1042 may be better discovered through the e-commerce platform 1000 through development of an application taxonomy (categories) that enable applications to be tagged according to a type of function it performs for a merchant;

through application data services that support searching, ranking, and recommendation models; through application discovery interfaces such as an application store, home information cards, an application settings page; and the like.

Applications 1042 may be connected to the core commerce facility 1036 through an extension/API layer 1040, such as utilizing APIs to expose the functionality and data available through and within the core commerce facility 1036 to the functionality of applications (e.g., through REST, GraphQL, and the like). For instance, the e-commerce platform 1000 may provide API interfaces to merchant and partner-facing products and services, such as may include, for example, application extensions, process flow services, developer-facing resources, and the like. With customers more frequently using mobile devices for shopping, applications 1042 related to mobile use may benefit from more extensive use of APIs to support the related growing commerce traffic. The flexibility offered through use of applications and APIs (e.g., as offered for application development) enable the e-commerce platform 1000 to better accommodate new and unique needs of merchants (and internal developers through internal APIs) without requiring constant change to the core commerce facility 1036, thus providing merchants what they need when they need it. For instance, shipping services 1022 may be integrated with the core commerce facility 1036 through a shipping or carrier service API, thus enabling the e-commerce platform 1000 to provide shipping service functionality without directly impacting code running in the core commerce facility 1036.

Many merchant problems may be solved by letting partners (e.g., third-party service providers) improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 1042, through extension/API 1040, help make products easy to view and purchase in a fast growing marketplace. In various embodiments, partners, application developers, internal applications facilities, and the like, may be provided with a software development kit (SDK), such as through creating a frame within the administrator 1014 that sandboxes an application interface. In various embodiments, the administrator 1014 may not have control over nor be aware of what happens within the frame. The SDK may be used in conjunction with a user interface kit to produce interfaces that mimic the look and feel of the e-commerce platform 1000, such as acting as an extension of the core commerce facility 1036.

Applications 1042 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 1036, such as for synchronizing a local database, notifying an external integration partner, and the like. Update events may enable this functionality without having to poll the core commerce facility 1036 all the time to check for updates, such as through an update event subscription. In various embodiments, when a change related to an update event subscription occurs, the core commerce facility 1036 may post a request, such as to a predefined callback URL. The body of this request may contain a new state of the object and a description of the action or event. Update event subscriptions may be created manually, in the administrator facility 1014, or automatically (e.g., via the API). In various embodiments, update events may be queued and processed asynchronously from a state change that triggered them, which may produce an update event notification that is not distributed in real-time.

Figure 9:
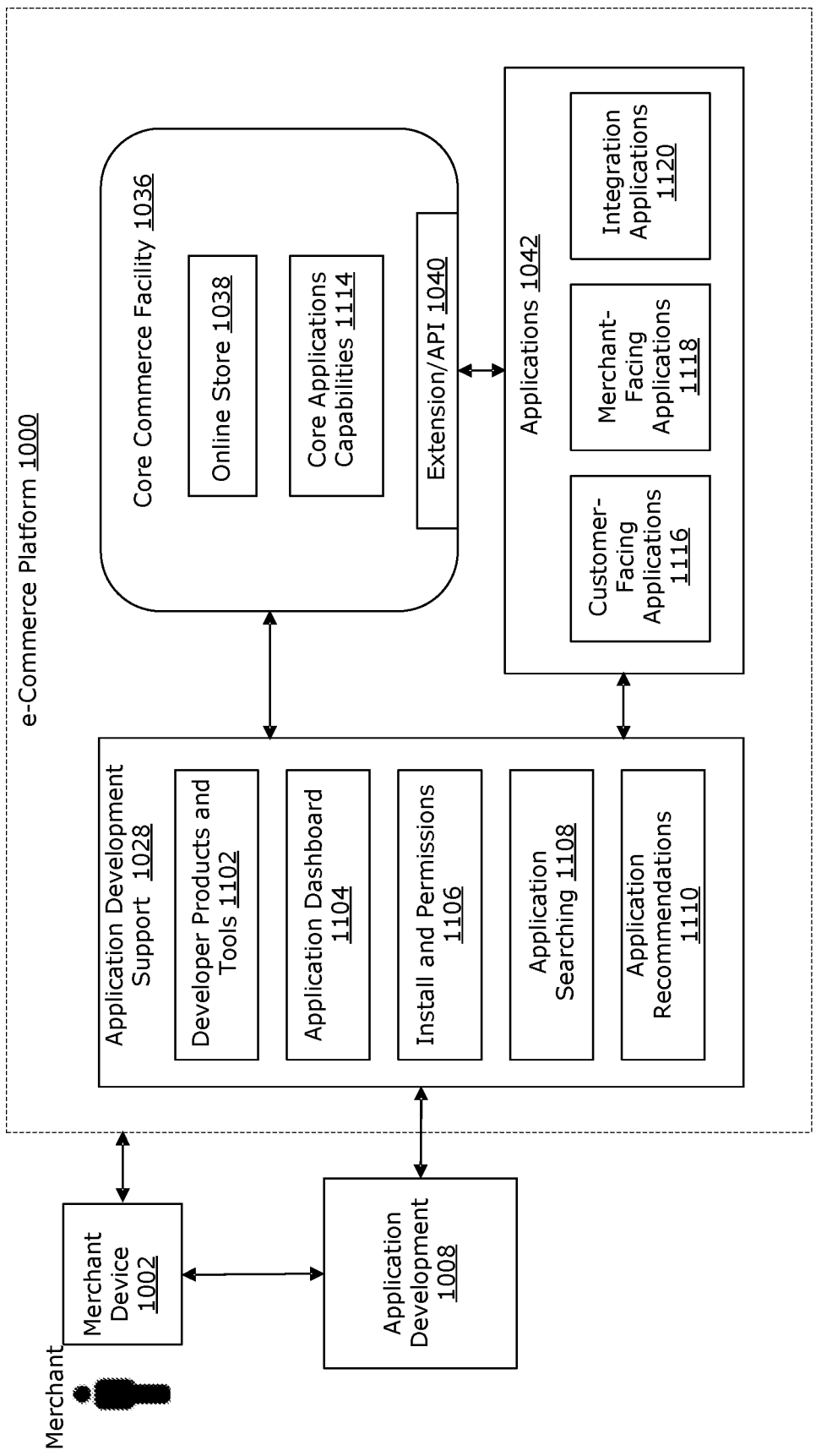
FIG. 9 is another block diagram of the e-commerce platform of FIG. 7, showing some details related to application development.

Reference is made to FIG. 9, which is another depiction of the e-commerce platform 1000. FIG. 9 omits some details that have been described with reference to FIG. 7, and shows further details discussed below. In various embodiments, the e-commerce platform 1000 may provide application development support 1028. Application development support 1028 may include developer products and tools 1102 to aid in the development of applications, an application dashboard 1104 (e.g., to provide developers with a development interface, to administrators for management of applications, to merchants for customization of applications, and the like), facilities for installing and providing permissions 1106 with respect to providing access to an application 1042 (e.g., for public access, such as where criteria must be met before being installed, or for private use by a merchant), application searching 1108 to make it easy for a merchant to search for applications 1042 that satisfy a need for their storefront 1039, application recommendations 1110 to provide merchants with suggestions on how they can improve the user experience through their storefront 1039, a description of core application capabilities 1114 within the core commerce facility 1036, and the like. These support facilities may be utilized by application development 1008 performed by any entity, including the merchant developing their own application 1042, a third-party developer developing an application 1042 (e.g., contracted by a merchant, developed on their own to offer to the public, contracted for use in association with the e-commerce platform 1000, and the like), or an application being developed by internal personal resources associated with the e-commerce platform 1000. In various embodiments, applications 1042 may be assigned an application identifier (ID), such as for linking to an application (e.g., through an API), searching for an application, making application recommendations, and the like. In some examples, at least some functionality of the application development support 1028, such as facilities for installing and providing permissions 1106, application searching 1108 and application recommendations 1110, may be provided in the form of a digital distribution platform (commonly referred to as an app store) that is part of the e-commerce platform 1000. The e-commerce platform 1000 may include the advertising platform 100, to enable serving advertisement objects to a merchant who is browsing or searching for applications of interest.

The core commerce facility 1036 may include base functions of the e-commerce platform 1000 and expose these functions through APIs to applications 1042. The APIs may enable different types of applications built through application development 1008. Applications 1042 may be capable of satisfying a great variety of needs for merchants but may be grouped roughly into three categories: customer-facing applications 1116, merchant-facing applications 1118, or integration applications 1120. Customer-facing applications 1116 may include storefront 1039 or channels 1010 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 1118 may include applications that allow the merchant to administer their storefront 1039 (e.g., through applications related to the web or website or to mobile devices), run their business (e.g., through applications related to POS devices 1052), to grow their business (e.g., through applications related to shipping (e.g., drop shipping), use of automated agents, use of process flow development and improvements), and the like. Integration applications 1120 may include applications that provide useful integrations that participate in the running of a business, such as shipping providers 1012 and payment gateways.

In various embodiments, an application developer may use an application proxy to fetch data from an outside location and display it on the page of an online storefront 1039. Content on these proxy pages may be dynamic, capable of being updated, and the like. Application proxies may be useful for displaying image galleries, statistics, custom forms, and other kinds of dynamic content. The core-application structure of the e-commerce platform 1000 may allow for an increasing number of merchant experiences to be built in applications 1042 so that the core commerce facility 1036 can remain focused on the more commonly utilized business logic of commerce.

The e-commerce platform 1000 provides an online shopping experience through a curated system architecture that enables merchants to connect with customers in a flexible and transparent manner. A typical customer experience may be better understood through an embodiment example purchase workflow, where the customer browses the merchant's products on a channel 1010, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 1010. A channel 1010 is a place where customers can view and buy products. In various embodiments, channels 1010 may be modeled as applications 1042 (a possible exception being the online store 1038, which is integrated within the core commence facility 1036). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their virtual shopping cart (in an alternate embodiment, a product may be purchased directly, such as through a buy button as described herein). Customers may add product variants to their shopping cart. The shopping cart model may be channel specific. The online store 1038 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 1000 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 1010 may use the core commerce facility 1036 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 1006 may be provided through the card server environment 1048. In various embodiments, the payment gateway 1006 may accept international payment, such as integrating with leading international credit card processors. The card server environment 1048 may include a card server application, card sink, hosted fields, and the like. This environment may act as the secure gatekeeper of the sensitive credit card information.

Figure 10:
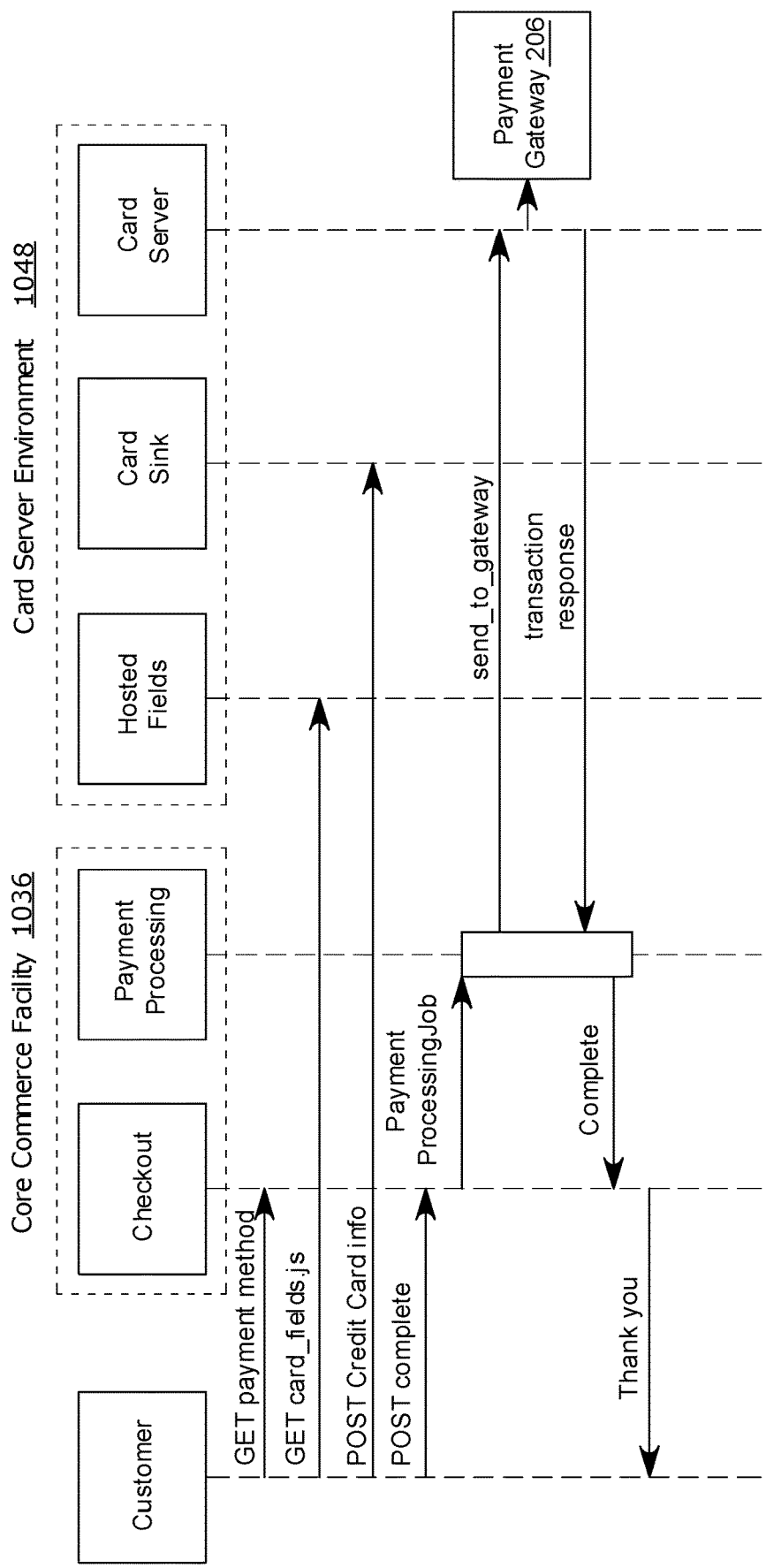
FIG. 10 shows an example data flow that may take place when a purchase is made using the e-commerce platform of FIG. 7.

FIG. 10 presents, in a non-limiting example, a simplified sequence diagram of the interactions between the core commerce facility 1036 and the card server environment 1048 during payment processing of a credit, prepaid, gift or other card on a Web Checkout.

In various embodiments, most of the process may be orchestrated by a payment processing job. The core commerce facility 1036 may support many other payment methods, such as through an offsite payment gateway 1006 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 1010 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as tailored towards impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 1036 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 1000 may make the merchant aware of compliance issues with respect to legal obligations (e.g., with respect to taxes). In various embodiments, the e-commerce platform 1000 may enable merchants to keep track of changes to the contract of sales over time, such as implemented through a sales model component (e.g., an append-only date-based ledger that records sale-related events that happened to an item).

Although the above discussion relates to fulfillment of a customer order by a merchant, a similar process may be involved for fulfillment of a merchant order by a supplier. For example, a merchant may similarly shop for products on a supplier's storefront 1039 and complete a similar checkout process to pay for the order.

In various examples, the present disclosure describes methods and systems for detecting invalid activity related to advertisement objects served by an advertising platform. Detection of invalid activity may be performed using detection thresholds that are dynamically changed in response to received user-initiated indicators of possible invalid activity. By accounting for indicators originating from multiple user accounts on the advertising platform (rather than relying on a single report of possible invalid activity), the advertising platform has greater confidence that there is a high likelihood of actual invalid activity and that it would be appropriate to change to using a more sensitive detection threshold. Further, clustering techniques can be used to identify common characteristics based on the user-initiated indicators, to enable the advertising platform to use more sensitive invalid activity detection for a specific subset of activity (rather than indiscriminately using a more sensitive detection threshold across all activity).

In various examples, the present disclosure also describes methods and systems for serving advertisement objects, after invalid activity has been detected. Instead of simply blocking an identified source of invalid activity, or simply permitting the invalid activity to continue (with later refunds to affected users on the advertising platform), decoy advertisement objects can be served to the identified source. In this way, the identified source is kept occupied and unaware it has been identified, while at the same time mitigating the negative effects of the invalid activity on affected users. The problem of simply blocking the identified source of invalid activity is that the attack may simply be rerouted to a different IP address (or to a different pattern of attack), thus evading detection. By keeping the identified source occupied with decoy advertisement objects, the source is effectively trapped by the advertising platform and is less likely to attempt rerouting the attack.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
in response to a request from a logged source of invalid activity, serving at least one advertisement object to the logged source of invalid activity, the at least one advertisement object configured to be unrenderable or unviewable when rendered by a browser; and
continuing to serve the at least one advertisement object that is configured to be unrenderable or unviewable when rendered to the logged source of invalid activity in response to further requests from the logged source of invalid activity.

2. The method of claim 1, wherein the request from the logged source of invalid activity is at least one of:
a search query;
a view event;
a navigation event; or
a home page event.

3. The method of claim 1, the method further comprising logging an identified source as the logged source of invalid activity.

4. The method of claim 3, wherein logging the identified source as the logged source of invalid activity comprises:
detecting activity from the identified source;
comparing the detected activity from the identified source with a defined threshold; and
in response to the comparing, identifying the identified source as the logged source of invalid activity.

5. The method of claim 4, wherein detecting activity from the identified source comprises:
detecting activity related to the advertisement object that is configured to be unrenderable or unviewable when rendered; and
identifying a source of the detected activity as the identified source.

6. The method of claim 3, further comprising:
after logging the identified source as the logged source of invalid activity, updating an activity log to indicate all previously logged historical activity from the identified source as invalid activity.

7. The method of claim 1, further comprising tracking activity related to the at least one advertisement object that is configured to be unrenderable or unviewable when rendered, wherein the tracked activity related to the at least one advertisement object is not billed to a user account.

8. The method of claim 3, wherein serving and continuing to serve the at least one advertisement object that is configured to be unrenderable or unviewable when rendered conceals that the identified source has been logged as the logged source of invalid activity.

9. A system comprising a processor in communication with storage, the processor configured to execute instructions from the storage to:
in response to a request from a logged source of invalid activity, serve at least one advertisement object to the logged source of invalid activity, the at least one advertisement object configured to be unrenderable or unviewable when rendered by a browser; and
continue to serve the at least one advertisement object that is configured to be unrenderable or unviewable when rendered to the logged source of invalid activity in response to further requests from the logged source of invalid activity.

10. The system of claim 9, wherein the request from the logged source of invalid activity is at least one of:
a search query;
a view event;
a navigation event; or
a home page event.

11. The system of claim 9, the system further comprising instructions for logging an identified source as the logged source of invalid activity.

12. The system of claim 11, wherein logging the identified source as the logged source of invalid activity comprises instructions for:
detecting activity from the identified source;
comparing the detected activity from the identified source with a defined threshold; and
in response to the comparing, identifying the identified source as the logged source of invalid activity.

13. The system of claim 12, wherein detecting activity from the identified source comprises instructions for:
detecting activity related to the advertisement object that is configured to be unrenderable or unviewable when rendered; and
identifying a source of the detected activity as the identified source.

14. The system of claim 11, further comprising instructions for:

after logging the identified source as the logged source of invalid activity, updating an activity log to indicate all previously logged historical activity from the identified source as invalid activity.

15. The system of claim 9, further comprising instructions for tracking activity related to the at least one advertisement object that is configured to be unrenderable or unviewable when rendered, wherein the tracked activity related to the at least one advertisement object is not billed to a user account.

16. The system of claim 11, wherein serving and continuing to serve the at least one advertisement object that is configured to be unrenderable or unviewable when rendered conceals that the identified source has been logged as the logged source of invalid activity.

17. A non-transitory computer-readable medium storing instructions that, when executed by one or more processors, cause the one or more processors to:

in response to a request from a logged source of invalid activity, serve at least one advertisement object to the logged source of invalid activity, the at least one advertisement object configured to be unrenderable or unviewable when rendered by a browser; and continue to serve the at least one advertisement object to the logged source of invalid activity in response to further requests from the logged source of invalid activity.

18. The non-transitory computer-readable medium of claim 17, storing further instructions that, when executed by one or more processors, cause the one or more processors to log an identified source as the logged source of invalid activity.

19. The non-transitory computer-readable medium of claim 18, storing further instructions that, when executed by one or more processors, cause the one or more processors to log the identified source as the logged source of invalid activity by:

detecting activity from the identified source;
comparing the detected activity from the identified source with a defined threshold; and
in response to the comparing, identifying the identified source as the logged source of invalid activity.

20. The non-transitory computer-readable medium of claim 18, storing further instructions that, when executed by one or more processors, cause the one or more processors to:

after logging the identified source as the logged source of invalid activity, update an activity log to indicate all previously logged historical activity from the identified source as invalid activity.

* * * * *